United States Patent
Park et al.

(10) Patent No.: US 11,314,548 B2
(45) Date of Patent: Apr. 26, 2022

(54) ELECTRONIC DEVICE AND SERVER FOR PROCESSING DATA RECEIVED FROM ELECTRONIC DEVICE

(71) Applicant: Samsung Electronics Co., Ltd., Gyeonggi-do (KR)

(72) Inventors: Sangmin Park, Gyeonggi-do (KR); Dongho Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 16/284,392

(22) Filed: Feb. 25, 2019

(65) Prior Publication Data

US 2019/0286480 A1    Sep. 19, 2019

(30) Foreign Application Priority Data

Mar. 19, 2018    (KR) .................. 10-2018-0031607

(51) Int. Cl.
```
G06F 9/48      (2006.01)
G06F 9/54      (2006.01)
H04L 29/08     (2006.01)
H04L 67/75     (2022.01)
```

(52) U.S. Cl.
CPC ............ *G06F 9/4881* (2013.01); *G06F 9/485* (2013.01); *G06F 9/543* (2013.01); *H04L 67/36* (2013.01)

(58) Field of Classification Search
None
See application file for complete search history.

(56) References Cited

U.S. PATENT DOCUMENTS

| | | |
|---|---|---|
| 8,762,469 B2 | 6/2014 | Lindahl |
| 2005/0010393 A1 | 1/2005 | Danieli et al. |
| 2010/0312547 A1 | 12/2010 | Van Os et al. |
| 2014/0188889 A1* | 7/2014 | Martens ............... H04N 21/466 |
| | | 707/740 |
| 2014/0222436 A1 | 8/2014 | Binder et al. |
| 2014/0310004 A1 | 10/2014 | Zhang |

(Continued)

FOREIGN PATENT DOCUMENTS

EP    1444687 A1    8/2004

OTHER PUBLICATIONS

International Search Report dated May 21, 2019.
European Search Report dated Nov. 26, 2020.

*Primary Examiner* — Lewis A Bullock, Jr.
*Assistant Examiner* — Melissa A Headly
(74) *Attorney, Agent, or Firm* — Cha & Reiter, LLC.

(57) ABSTRACT

A server may include a communication circuit, at least one processor electrically connected to the communication circuit, and at least one memory electrically connected to the at least one processor. The at least one memory stores instructions for receiving, from a first external device, first data related to a user input that requests performance of a task, receiving, second data associated with a plurality of application programs, determining a domain related to the task based on at least some of the first data and at least some of the second data, determining a likely intention of a user providing the user input, based on at least some of the first data, and determining a sequence of states of the first external device based on the domain and the likely intention, providing the sequence of states to the first external device.

16 Claims, 13 Drawing Sheets

(56) References Cited

U.S. PATENT DOCUMENTS

| | | | |
|---|---|---|---|
| 2015/0015511 A1* | 1/2015 | Kwak | G06F 1/3265 |
| | | | 345/173 |
| 2015/0019216 A1 | 1/2015 | Singh et al. | |
| 2016/0034253 A1 | 2/2016 | Bang et al. | |
| 2016/0104484 A1 | 4/2016 | Chakladar et al. | |
| 2017/0076724 A1* | 3/2017 | Park | G10L 15/08 |
| 2017/0352352 A1* | 12/2017 | Wang | G06F 3/167 |

\* cited by examiner

ELECTRONIC DEVICE AND SERVER FOR PROCESSING DATA RECEIVED FROM ELECTRONIC DEVICE

CROSS-REFERENCE TO RELATED APPLICATION(S)

This application is based on and claims priority under 35 U.S.C. § 119 to Korean Patent Application No. 10-2018-0031607, filed on Mar. 19, 2018, in the Korean Intellectual Property Office, the disclosure of which is incorporated by reference herein in its entirety.

BACKGROUND

1) Field

The present disclosure relates to a technology of processing data related to a user input.

2) Description of Related Art

The above information is presented as background information only to assist with an understanding of the present disclosure. No determination has been made, and no assertion is made, as to whether any of the above might be applicable as prior art with regard to the present disclosure.

Recently, electronic devices are capable of supporting various input schemes, such as a voice input scheme or the like, in addition to a conventional input scheme using a keyboard or a mouse. For example, electronic devices, such as a smart phone or a tablet, may recognize a user voice that is input in the state in which a voice recognition service is executed, and may execute an operation corresponding to the voice input or may provide a search result corresponding to the voice input.

It is important that the operation of an electronic device in response to the voice input reflect the user's actual intent.

SUMMARY

In order to process a user input, the electronic devices may use an external server that has a communication connection to the electronic devices. For example, when an electronic device receives a voice input, the electronic device may transmit data related to the voice input to a server. The server may recognize and analyze the data related to the voice input, and transmits a result corresponding to the voice input to the electronic device.

When an electronic device receives a voice input, the electronic device has a high probability of performing a task corresponding to the voice input with respect to an application that is displayed on the current screen, often known as running in the foreground. However, by taking into consideration of various scenarios of the use of an electronic device by a user, the user may request performance of a task from another application different from the application that is displayed on the current screen, such as an application that is running in the background, or not even launched.

For example, when the execution screens of a plurality of applications overlap each other, or when the execution screens of a plurality of applications are displayed on divided screens, a user may desire to perform one of the plurality of applications. Alternatively, the user may desire to perform an application corresponding to a short-cut icon on a wallpaper. In this instance, generally, the user may select an application or may call the name of the application, and may request performance of a task in the selected application. However, that may cause discontinuity in the use by the user or may require the user to memorize the accurate name of the application.

Therefore, various embodiments of the present disclosure provide a method in which an electronic device performs a task on an application corresponding to the likely intention of a user from among a plurality of executable applications.

In accordance with an aspect of the present disclosure, there is provided a server, including: a communication circuit; at least one processor electrically connected to the communication circuit; at least one memory electrically connected to the at least one processor, wherein the at least one memory stores instructions, which are configured to enable the at least one processor to perform operations when the server operates, the operations comprising: receiving, from a first external device via the communication circuit, first data related to a user input that requests performance of a task; receiving, from the first external device via the communication circuit, second data associated with a plurality of application programs; determining a domain related to the task based on at least some of the first data and at least some of the second data; determining a likely intention of a user providing the user input, based on the at least some of the first data; and determining a sequence of states of the first external device based on the domain and the likely intention.

In accordance with an aspect of the present disclosure, there is provided an electronic device, including: a housing; a display disposed inside the housing, and exposed via a first part of the housing; a microphone disposed inside the housing, and exposed via a second part of the housing; a communication circuit disposed inside the housing; at least one processor disposed inside the housing, and electrically connected to the display, the microphone, and the communication circuit; and at least one memory disposed inside the housing, and electrically connected to the processor, wherein the at least one memory stores instructions configured to enable the processor to perform operations when the electronic device operates, the operations including: executing a plurality of application programs; displaying, on the display, an execution screen of a first application program among the plurality of application programs; receiving a user input for requesting performance of a task via the microphone while the execution screen of the first application program is displayed; transmitting, to an external server via the communication circuit, first data related to the user input and second data including information associated with the plurality of application programs; receiving third data including a sequence of states of the electronic device from the external server via the communication circuit, in response to the transmission of the first data and the second data; and performing the task using at least one of the plurality of application programs, according to the sequence of states.

In accordance with an aspect of the present disclosure, there is provided a method of determining an operation state of an external device, by a server, the method comprising: receiving, from a first external device, first data related to a user input that requests a task; receiving second data including information associated with a plurality of application programs from the first external device; determining a domain related to the task based on at least some of the first data and at least some of the second data; determining a user's likely intention associated with the task, based on the at least some of the first data; determining a sequence of states for the first external device based on the domain and the likely intention.

In accordance with an aspect of the present disclosure, there is provided a method of performing an operation based on a user input, by an electronic device, the method including: executing a plurality of application programs; displaying an execution screen of a first application program from among the plurality of application programs; receiving a user input for requesting performance of a task via a microphone while an execution screen of the first application program is displayed; transmitting first data related to the user input and second data including information associated with the plurality of application programs to an external server; receiving third data including a sequence of states of the electronic device from the external server, in response to the transmission of the first data and the second data; and performing the task using at least one of the plurality of application programs, according to the sequence of the states.

In accordance with an aspect of the present disclosure, there is provided a computer program product including a computer-readable recording medium, the computer program product comprising instructions, wherein the instructions are configured to enable an electronic device to perform: receiving first data related to a user input that requests a task from a first external electronic device; receiving second data including information associated with a plurality of application programs from the first external electronic device; determining a domain related to the task based on at least some of the first data and at least some of the second data; determining a user's likely intention associated with the task based on the at least some of the first data; determining a sequence of states for the first external device based on the domain and the likely intention; and providing the sequence of states to the first external device.

According to various embodiments, as a user input is provided, an electronic device performs a task associated with the user input with respect to an application that corresponds best to the intention of a user, from among a plurality of executable applications.

Accordingly, the inconvenience for a user when the user searches for a desired application in order to perform the task may be alleviated, and the convenience of a user who uses an electronic device may be improved. Also, the user may quickly receive a desired service via a task and be highly satisfied with the service.

In addition, various effects directly or indirectly recognized via the present disclosure may be provided.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, various embodiments of the present disclosure will be described with reference to the accompanying drawings. However, it should be understood that there is no intent to limit the present disclosure to particular forms, and the present disclosure should be construed to cover all modifications, equivalents, and/or alternatives falling within the spirit and scope of the embodiments of the present disclosure.

Before describing an embodiment of the present disclosure, an integrated intelligent system to which an embodiment of the present disclosure is applicable will be described.

Figure 1:
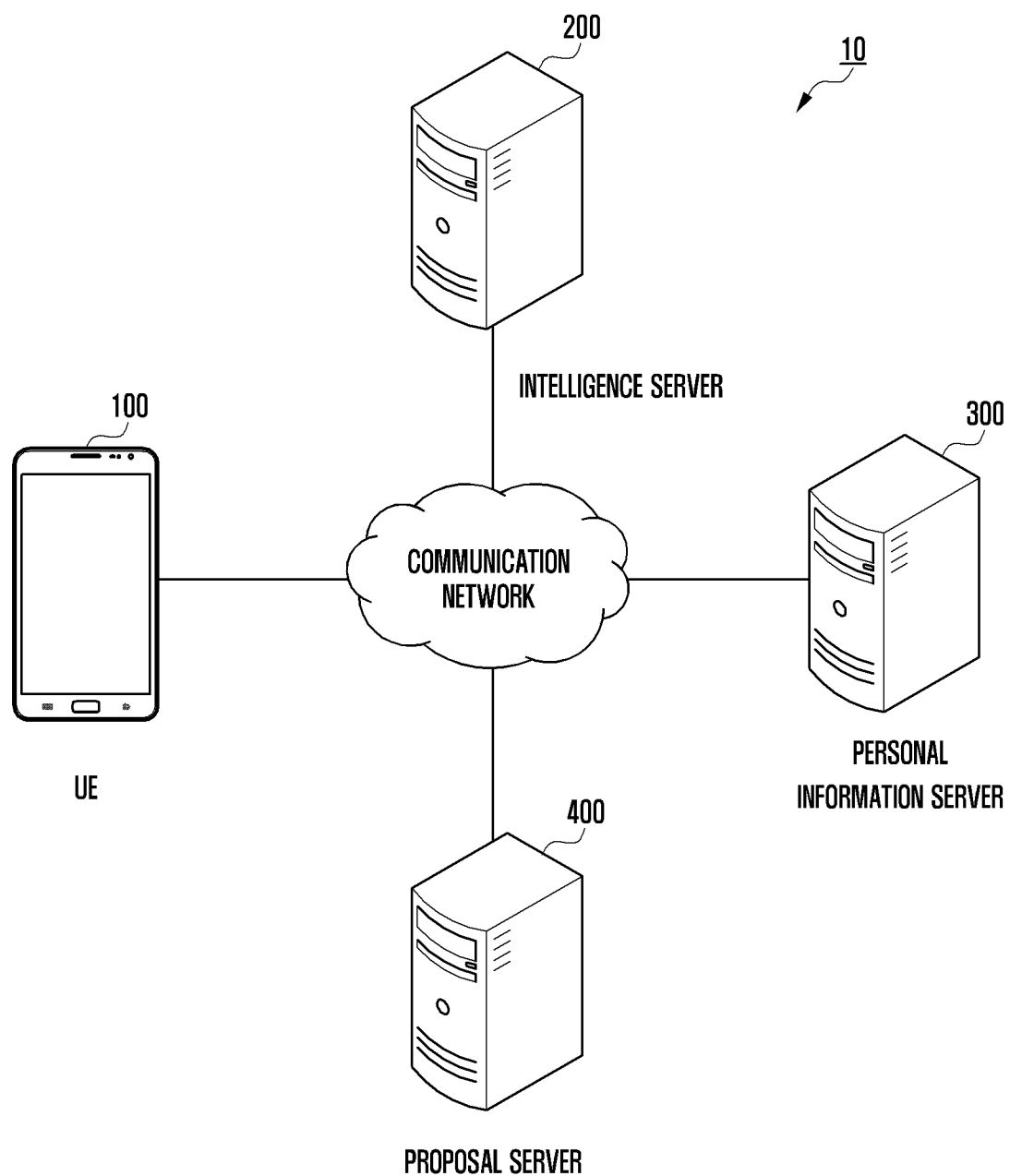
FIG. 1 is a diagram illustrating an integrated intelligent system according to various embodiments.

FIG. 1 is a diagram illustrating an integrated intelligent system according to various embodiments.

Referring to FIG. 1, an integrated intelligent system 10 may include a user equipment (UE) 100, an intelligence server 200, a personal information server 300, or a proposal server 400.

The UE 100 may include a microphone for a user to provide a voice command requesting a task. The voice command can request an operation from one of a plurality of applications. The plurality of applications can either be running in the foreground or the background. The UE 100 can provide at least some of the voice input, if not the entire voice input to the intelligence server 200, along with information about the plurality of applications. The information about the plurality of applications can include information relating to the application running in the foregoing as well as a second application(s) that is either running in the background, paused, or previously run and terminated within a predetermined time period.

The intelligence server 200 can receives the voice input, or at least some of the voice input, as well as the information about the plurality of application (or at least some). The intelligence server 200 can determine a domain related to the task, and likely intention of the user to determine a sequence of states. The intelligence server 200 provides the sequence of states to the UE 100. The UE 100 uses the sequence of states to perform the task. In some embodiments, UE 100 uses the sequence of states to perform a task that has a high likelihood of reflecting the user's intentions with their voice command.

The UE 100 may provide services that a user desires, via apps (or application programs) stored in the UE 100 (e.g., an alarm app, a message app, a picture (gallery) app, or the like). For example, the UE 100 may execute and operate another app via an intelligence app (or a voice recognition app) stored in the UE 100. The UE 100 may execute another app and may receive a user input for executing the operation of the other app, via the intelligence app. The user input may be received via, for example, a physical button, a touch pad, a voice input, a remote input, or the like. According to an embodiment, the UE 100 may be one of the various terminal devices (or electronic devices) which are capable of making connection to the Internet, for example, a portable phone, a smart phone, a personal digital assistant (PDA), a notebook computer, and the like.

According to an embodiment, the UE 100 may receive user speech as a user input. The UE 100 may receive the user speech, and may generate a command to execute an app based on the user speech. Accordingly, the UE 100 may execute the app using the command.

The intelligence server 200 may receive a user voice input from the UE 100 via a communication network, and may change the user voice input into text data. According to another embodiment, the intelligence server 200 may generate (or select) a path rule based on the text data. The path rule may include information associated with actions (or operations) for performing the function of an app, or information associated with a parameter needed to execute the action. Also, the path rule may include the sequence of actions of the app. The UE 100 may receive the path rule, may select an app according to the path rule, and may execute the actions included in the path rule in the selected app.

The term "path rule" used in the present document generally indicates the sequence of states of an electronic device when performing a task requested by a user. However, the present disclosure is not limited thereto. In other words, the path rule may include the sequence of states. The task may be, for example, an action that an intelligence app may provide. The task may include generating a schedule, transmitting a picture to a selected contact, and providing weather information. The UE 100 may sequentially go through at least one state (e.g., at least one operation state of the UE 100), thereby performing the task.

According to an embodiment, the path rule may be provided or created by an artificial intelligent (AI) system. The AI system may be a rule-based system or a neural network-based system (e.g., feedforward neural network (FNN) or recurrent neural network (RNN)). Alternatively, the AI system may be a combination of above-described systems, or another AI system which is different from above-described systems. According to an embodiment, the path rule may be selected from a set of predetermined path rules, or may be created in real time in response to a user request. For example, AI system may select at least one path rule from among a plurality of predetermined path rules, or may create a path rule dynamically (or in real time). Also, the UE 100 may use a hybrid system for providing a path rule.

According to an embodiment, the UE 100 may execute the action, and may display, on a display, a screen corresponding to the state of the UE 100 that executes the action. According to another embodiment, the UE 100 executes the action, and may not display a result of executing the action on the display. The UE 100 may execute, for example, a plurality of actions, and may display only some of the results of executing the plurality of actions on the display. For example, the UE 100 may display only a result of executing the last action on the display. As another example, the UE 100 may display, on the display, a result of executing an action upon reception of a user input.

The intelligence server 200 may use information particularized to the user of the UE 100 to determine the sequence of states. The information may include past user experience information, and history of execution information. The foregoing information can be stored in a personal information server 300.

The personal information server 300 may include a database that stores user information. For example, the personal information server 300 may receive user information (e.g., context information, app execution, or the like) from the UE 100, and may store the same in the database. The intelligence server 200 may receive the user information from the personal information server 300 over a communication network, and may use the same for generating a path rule associated with a user input. According to an embodiment, the UE 100 may receive user information from the personal information server 300 via a communication network, and may use the user information for managing a database.

The proposal server 400 may include a database storing information associated with introductions of functions or applications of the UE or information associated with functions to be provided. For example, the proposal server 400 may receive user information associated with the UE 100 from the personal information server 300, and may include a database associated with a function that a user is capable of using. The UE 100 may receive the information associated with the function to be provided, from the proposal server 400 over the communication network, and may provide the information to a user.

Figure 2:
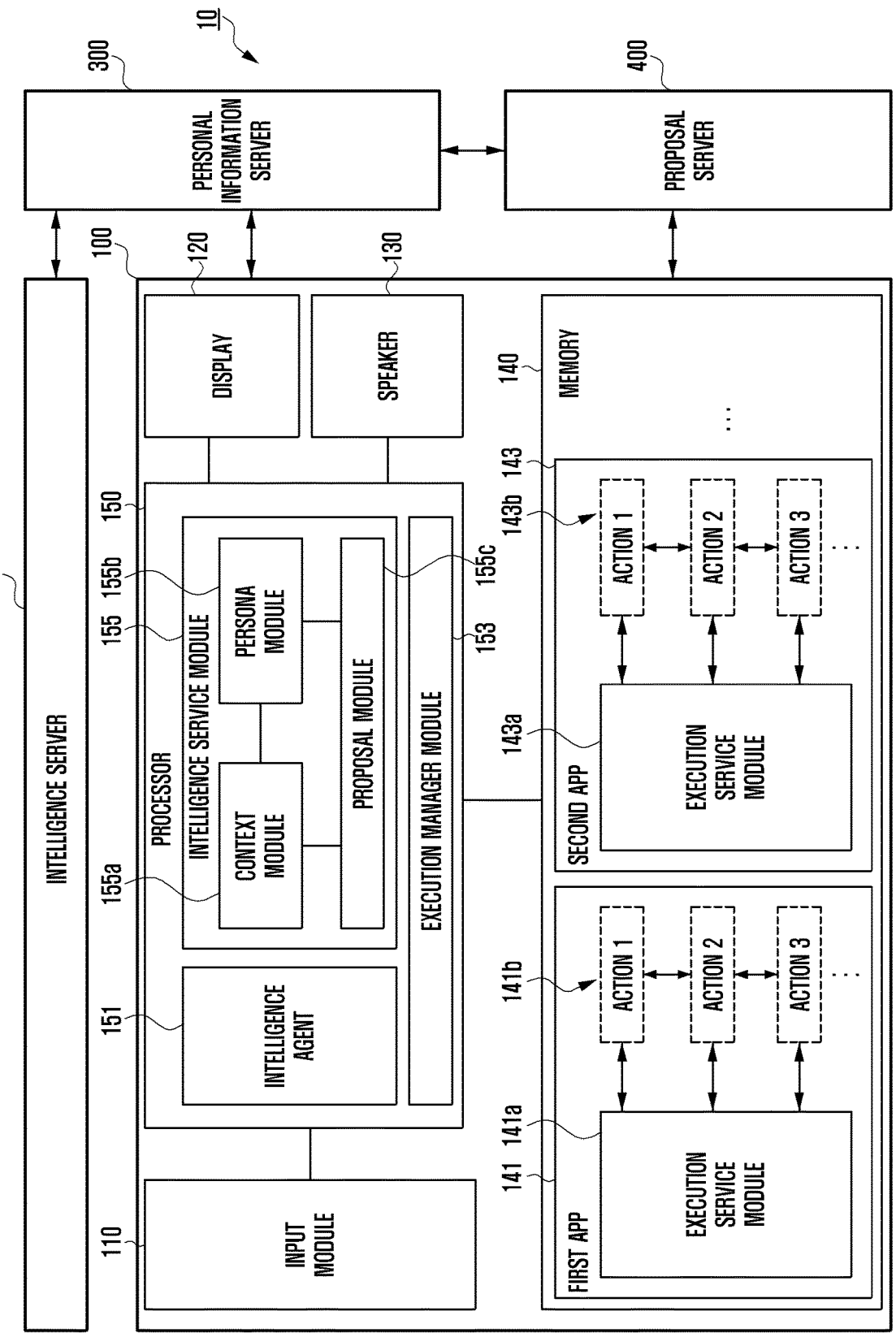
FIG. 2 is a block diagram illustrating a user equipment (UE) of an integrated intelligent system according to various embodiments.

FIG. 2 is a block diagram illustrating a user equipment (UE) of an integrated intelligent system according to an embodiment.

Referring to FIG. 2, the UE 100 may include an input module 110, a display 120, a speaker 130, a memory 140, or a processor 150. The UE 100 may further include a housing, and the elements of the UE 100 may be seated inside the housing or may be disposed on the housing.

According to an embodiment, the input module 110 may receive a user input from a user. For example, the input module 110 may receive a user input from an external device (e.g., a keyboard or a headset) connected thereto. As another example, the input module 110 may include a touch screen (e.g., a touch screen display) coupled with the display 120. As another example, the input module 110 may include a hardware key (or physical key) disposed in the UE 100 (or the housing of the UE 100).

According to an embodiment, the input module 110 may include a microphone (including an analog/digital converter to convert the voice to a digital signal) that is capable of receiving user speech as a voice signal. For example, the input module 110 may include a speech input system, and may receive user speech as a voice signal via the speech input system.

According to an embodiment, the display 120 may display an image, a video, and/or the execution screen of an application. For example, the display 120 may display a graphic user interface (GUI) of an app.

According to an embodiment, the speaker 130 may output a voice signal. For example, the speaker 130 may output, to the outside, a voice signal generated inside the UE 100.

According to an embodiment, the memory 140 may store a plurality of apps (or application programs) 141 and 143. The plurality of apps 141 and 143 stored in the memory 140 may be selected, executed, and run according to a user input.

According to an embodiment, the memory 140 may include a database storing information required for recognizing a user input. For example, the memory 140 may include a log database storing log information. As another example, the memory 140 may include a persona database storing user information.

According to an embodiment, the memory 140 may store the plurality of apps 141 and 143, and the plurality of apps 141 and 143 may be loaded and run. For example, the plurality of apps 141 and 143 stored in the memory 140 may be loaded by an execution manager module 153 of the processor 150 and may run. The plurality of apps 141 and 143 may respectively include execution service modules 141a and 143a that perform functions. According to an embodiment, the plurality of apps 141 and 143 may execute a plurality of actions (the sequence of states) 141b and 143b via the execution service modules 141a and 143a in order to perform functions. That is, the execution service modules 141a and 143a may be activated by the execution manager module 153, and may execute the plurality of actions 141b and 143b.

According to an embodiment, when the action 141b or 143b of the app 141 or 143 is executed, the execution screen associated with the execution of the action 141b or 143b may be displayed on the display 120. The execution screen may be, for example, a screen when the action 141b or 143b is completed. As another example, the execution screen may be a screen when the execution of the action 141b or 143b is paused (partial landing) (e.g., when a parameter required for performing the action 141b or 143b is not input).

According to an embodiment, the execution service module 141a or 143a may execute the action 141b or 143b according to a path rule. For example, the execution service module 141a or 143a may be activated by the execution manager module 153, may receive an execution request from the execution manager module 153 according to the path rule, and may perform the action 141b or 143b in response to the execution request, thereby executing the function of the app 141 or 143. When the action 141b or 143b is completed, the execution service module 141a or 143a may transmit completion information to the execution manager module 153.

According to an embodiment, when the plurality of actions 141b or 143b is executed in the app 141 or 143, the plurality of actions 141b or 143b may be sequentially executed. When a single action (e.g., action 1 of the first app 141 or action 1 of the second app 143) is completed, the execution service module 141a or 143a may open a subsequent action (e.g., action 2 of the first app 141 or action 2 of the second app 143), and may transmit completion information to the execution manager module 153. Here, opening an action indicates that shifting to a state in which the action is executable, or preparing for the execution of the action. In other words, when the action is not open, the corresponding action may not be executed. When the completion information is received, the execution manger module 153 may transmit a request for executing the subsequent action (e.g., action 2 of the first app 141 or action 2 of the second app 143) to the execution service module 141a or 143a. According to an embodiment, when the plurality of apps 141 and 143 are executed, and the plurality of apps 141 and 143 may be executed sequentially. For example, when completion information is received after the execution of the last action of the first app 141 (e.g., action 3 of the first app 141), the execution manager module 153 may transmit a request for executing the first action (e.g., action 1 of the second app 143) of the second app 143 to the execution service module 143a.

According to an embodiment, when a plurality of actions 141b or 143b are executed in the app 141 or 143, the result screen associated with the execution of each of the plurality of actions 141b or 143b may be displayed on the display 120. According to an embodiment, only some of the plurality of result screens associated with the execution of the plurality of actions 141b or 143b may be displayed on the display 120.

According to an embodiment, the memory 140 may store an intelligence app (e.g., a voice recognition app) that interoperates with an intelligence agent 151. The app interoperates with the intelligence agent 151 may receive user speech as a voice signal, and may process the voice signal. According to an embodiment, the app that interoperates with the intelligence agent 151 may run by a predetermined input provided via the input module 110 (e.g., an input via a hardware key, an input via a touch screen, or a predetermined voice input).

According to an embodiment, the processor 150 may control the general operation of the UE 100. For example, the processor 150 may receive a user input by controlling the input module 110. The processor 150 may display an image by controlling the display 120. The processor 150 may control the speaker 130 to output a voice signal. The processor 150 my control the memory 140 so as to retrieve or store information that is needed.

Additionally, the processor 150 may run a plurality of applications. The plurality of applications 150 can include a first application running in the foreground, and second application(s) running, paused, or previously run and terminated within a predetermined time period.

According to an embodiment, the processor 150 may include the intelligence agent 151, the execution manager module 153, or an intelligence service module 155. The processor 150 may execute instructions stored in the memory 140 so as to run the intelligence agent 151, the execution manager module 153, or the intelligence service module 155. Various modules mentioned in various embodiments of the present disclosure may be implemented as hardware or software. The operations performed by the intelligence agent 151, the execution manager module 153, or the intelligence service module 155 in various embodiments of the present disclosure may be understood as the operations performed by the processor 150.

The intelligence agent 151 may generate a command to run an app based on a voice signal received as a user input. According to an embodiment, the execution manager module 153 may receive the generated command from the intelligence agent 151, may select the app 141 or 143 stored in the memory 140, and may execute the selected app to run. The intelligence service module 155 may manage user information, and may use the user information to process a user input.

The intelligence agent 151 may transmit a user input received via the input module 110 to the intelligence server 200, and may process the user input.

The intelligence agent 151 may preprocess the user input before transmitting the user input to the intelligence server 200. According to an embodiment, the intelligence agent 151 may include an adaptive echo canceller (AEC) module, a noise suppression (NS) module, an end-point detection (EPD) module, or an automatic gain control (AGC) module in order to preprocess the user input. The AEC module may cancel echo included in the user input. The NS module may suppress background noise included in the user input. EPD module may detect the end-point of a user voice included in the user input, so as to detect a part where the user voice exists. The AGC module may control the volume of the user input to be suitable for a process of recognizing and processing the user input. According to an embodiment, the intelligence agent 151 may include whole of the above-described preprocessing configuration for the performance. However, according to another embodiment, the intelligence agent 151 may include some of the above-described preprocessing configuration in order to run at a low power.

The intelligence agent 151 may include a wakeup recognition module that recognizes a call from a user. The wakeup recognition module may recognize a wakeup command from a user via a voice recognition module, and when receiving the wakeup command, the wakeup recognition module may activate the intelligence agent 151 in order to receive a user input. The wakeup recognition module of the intelligence agent 151 may be implemented in a low-power processor (e.g., a processor included in an audio codec). The intelligence agent 151 may be activated by a user input provided via a hardware key. When the intelligence agent 151 is activated, an intelligence app (e.g., a voice recognition app) that interoperates with the intelligence agent 151 may be executed.

The intelligence agent 151 may include a voice recognition module for executing a user input. The voice recognition module may recognize a user input for executing an action in an app. For example, the voice recognition module may recognize a limited user input (voice input) that executes an action, such as a wakeup command (e.g., a speech "click" or the like which executes a photographing action when a camera app runs). For example, the voice recognition module that recognizes a user input by assisting the intelligence server 200, may recognize a user command that may be processed in the UE 100, and may quickly process the same. The voice recognition module for executing a user input of the intelligence agent 151 may be implemented in an app processor.

The voice recognition module of the intelligence agent 151 (including the voice recognition module of the wakeup module) may recognize a user input using an algorithm for recognizing a voice. The algorithm used for recognizing a voice may be, for example, at least one from among a hidden markov model (HMM) algorithm, an artificial neural network (ANN) algorithm, and a dynamic time warping (DTW) algorithm.

The intelligence agent 151 may convert a user voice input into text data. The intelligence agent 151 may transfer a user voice to the intelligence server 200 and may receive converted text data. Accordingly, the intelligence agent 151 may display the text data on the display 120.

The intelligence agent 151 may receive a path rule transmitted from the intelligence server 200. The intelligence agent 151 may transmit the path rule to the execution manager module 153.

The intelligence agent 151 may transmit, to the intelligence service module 155, an execution result log associated with the path rule received from the intelligence server 200, and the transmitted execution result log may be accumulated as user preference information of the persona module (persona manager) 155b and may be managed.

The execution manager module 153 may receive the path rule from the intelligence agent 151, may run the app 141 or 143, and may enable the app 141 or 143 to execute the action 141b or 143b included in the path rule. The execution manager module 153 may transmit command information (e.g., path rule information) associated with the execution of the action 141b or 143b to the app 141 or 143, and may receive completion information associated with the action 141b or 143b from the app 141 or 143.

The execution manager module 153 may transmit and receive command information (e.g., path rule information) associated with the execution of the action 141b or 143b of the app 141 and 143 between the intelligence agent 151 and the app 141 or 143. The execution manager module 153 may bind the app 141 or 143 to be executed according to the path rule, and transmit the command information (e.g., path rule information) associated with the action 141b or 143b included in the path rule to the app 141 or 143. For example, the execution manager module 153 may sequentially transmit the action 141b or 143b included in the path rule sequentially to the app 141 or 143, and may sequentially execute the action 141b or 143b of the app 141 or 143 according to the path rule.

The execution manager module 153 may manage the execution state of the action 141b or 143b of the app 141 or 143. For example, the execution manager module 153 may receive information associated with the execution state of the action 141b or 143b from the app 141 or 143. When the execution state of the action 141b or 143b is, for example, a paused state (partial landing) (e.g., when a parameter required for the action 141b or 143b is not input), the execution manager module 153 may transmit information associated with the paused state to the intelligence agent 151. The intelligence agent 151 may request input of required information (e.g., parameter information) from a user, using the received information. As another example, when the execution state of the action 141b or 143b is a running state, user speech may be received from a user, and the execution manager module 153 may transmit information associated with the running app 141 or 143 and the execution state of the app 141 or 143 to the intelligence agent 151. The intelligence agent 151 may receive parameter information of the user speech via the intelligence server 200, and may transmit the received parameter information to the execution manager module 153. The execution manager module 153 may change a parameter of the action 141b or 143b into a new parameter using the received parameter information.

The execution manager module 153 may transfer parameter information included in the path rule to the app 141 or 143. When the plurality of apps 141 and 143 are sequentially executed according to the path rule, the execution manager module 153 may transfer parameter information included in the path rule from one app and to another app.

The execution manager module 153 may receive a plurality of path rules. The execution manager module 153 may select a plurality of path rules based on user speech. For example, when user speech specifies the app 141 for executing some actions 141b but does not specify another app 143 to execute the remaining actions 143b, the execution manager module 153 may receive a plurality of different path rules that execute the same app 141 (e.g., a gallery app) for executing the same actions 141b, and execute different apps 143 (e.g., a message app, a telegram app, and the like) for executing the remaining actions 143b. The execution manager module 153 may execute, for example, the same actions 141b or 143b (e.g., consecutive actions 141b or 143b which are common to the plurality of path rules). When the same actions are executed, the execution manager module 153 may display, on the display 120, a state screen for selecting one of the different apps 141 and 143 respectively included in the plurality of path rules.

The intelligence service module 155 may include a context module 155a, the persona module 155b, and a proposal module 155c.

The context module 155a may collect the current state of the app 141 or 143 from the app 141 or 143. For example, the context module 155a may receive context information indicating the current state of the app 141 or 143, and may collect the current state of the app 141 or 143.

The persona module 155b may manage personal information of a user who uses the UE 100. For example, the persona module 155b may collect usage information and execution results of the UE 100, and may manage the same as personal information of the user.

The proposal module 155c may predict the intention of a user, and may recommend a command to the user. For example, the proposal module 155c may recommend a command to the user by taking into consideration the current state of the user (e.g., a time, a place, a situation, and an app).

Figure 3:
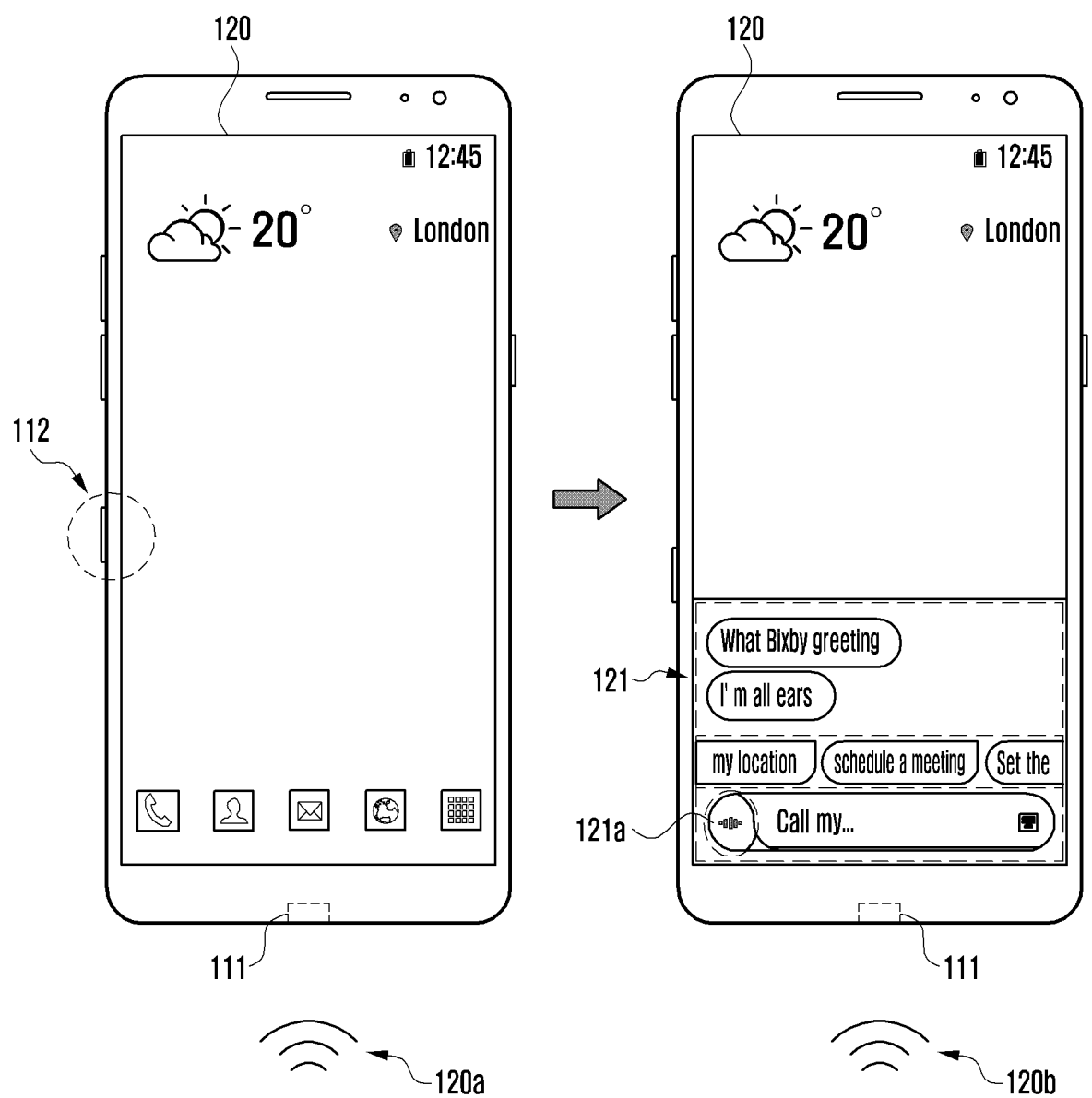
FIG. 3 is a diagram illustrating an example of executing an intelligence application of a UE according to various embodiments.

FIG. 3 is a diagram illustrating an example of executing an intelligence application of a UE according to an embodiment.

Referring to FIG. 3, the UE 100 receives a user input, and executes an intelligence app (e.g., a voice recognition app) interoperating with the intelligence agent 151.

According to an embodiment, the UE 100 may use the hardware key 112 to execute an intelligence app for recognizing a voice. For example, when a user input is received via the hardware key 112, the UE 100 may display a user interface (UI) 121 of the intelligence app on the display 120. For example, a user may touch a voice recognition button 121a on the UI 121 of the intelligence app, in order to input a voice input 120b while the UI 121 of the intelligence app is displayed on the display 120. As another example, the user may continuously press the hardware key 112 to input the voice input 120b, thereby inputting the voice input 120b.

According to an embodiment, the UE 100 may execute an intelligence app for recognizing a voice via the microphone 111. For example, when a designated voice input (e.g., wake up!) 120a is input via the microphone 111, the UE 100 may display the UI 121 of the intelligence app on the display 120.

The UE 100 can receive a voice input 121a for requesting performance of a task via the microphone and provide the voice input 121a (or a portion thereof) and information related to a plurality of applications to the intelligence server 200. The intelligence server 200 can provide the UE 100 with a sequence of states. The UE 100 can use the sequence of states to perform a task that is most likely the task intended to be performed by the user.

Figure 4:
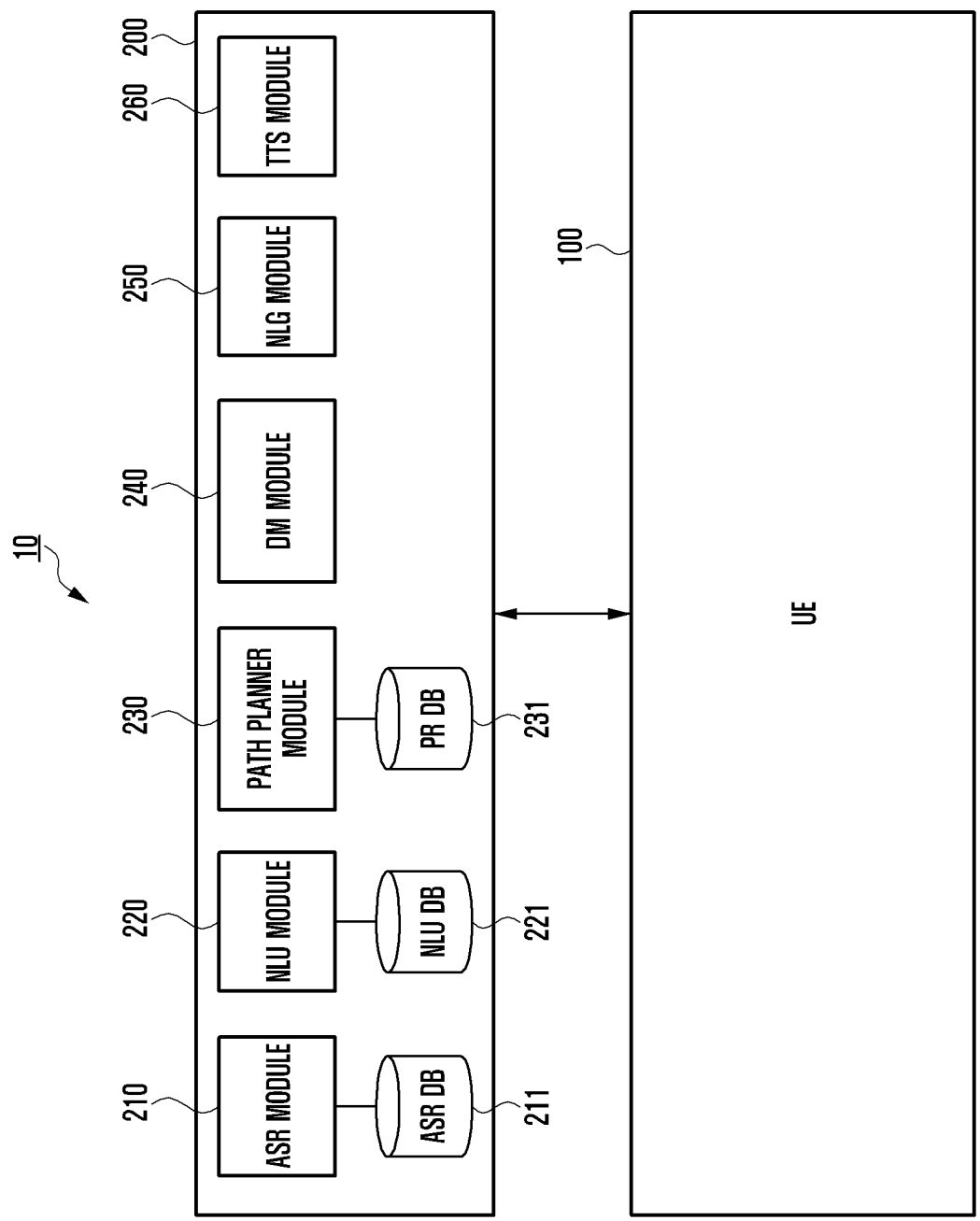
FIG. 4 is a block diagram illustrating an intelligence server of an integrated intelligent system according to various embodiments.

FIG. 4 is a block diagram illustrating an intelligence server of an integrated intelligent system according to an embodiment.

Referring to FIG. 4, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260.

The NLU module 220 or the path planner module 230 of the intelligence server 200 may generate a path rule.

According to an embodiment, ASR module 210 may convert user input received from the UE 100 into text data. For example, the ASR module 210 may include a speech recognition module. The speech recognition module may include an acoustic model and a language model. For example, the acoustic model may include information associated with vocalization, and the language model may include unit phoneme information and information associated with a combination of unit phoneme information. The speech recognition module may convert user speech into text data using the information associated with vocalization and the information associated with unit phoneme information. The information associated with the acoustic model and the language model may be stored in, for example, an automatic speech recognition database (ASR DB) 211.

According to an embodiment, the NLU module 220 may perform syntactic analysis or semantic analysis so as to recognize a user intention. The syntactic analysis divides a user input into syntactic units (e.g., words, phrases, morphemes, or the like), and may recognize syntactic elements corresponding to the syntactic units. The semantic analysis may be performed using semantic matching, rule matching, formula matching, or the like. Accordingly, the NLU module 220 may obtain a domain, a user's likely intention, or a parameter (or a slot) required for expressing the intent, in association with a user input.

According to an embodiment, the NLU module 220 may determine a user intention and a parameter using matching rules for a domain, a user's likely intention, and a parameter (slot) required for recognizing the intention. For example, a single domain (e.g., an alarm) may include a plurality of intentions (e.g., setting an alarm, canceling an alarm, and the like), and one intention includes a plurality of parameters (e.g., a time, the number of repetitions, an alarm tone, and the like). The plurality of rules may include, for example, one or more essential element parameters. The matching rules may be stored in a natural language understanding database (NLU DB) 221.

According to an embodiment, the NLU module 220 may recognize the meaning of a word extracted from a user input using linguistic features (e.g., syntactic elements) such as morphemes, phrases, and the like, and may match the recognized meaning of the word against a domain and a user's likely intention, so as to determine a user intention. For example, the NLU module 220 may calculate how many words extracted from a user input are included in each domain and each intention, so as to determine a user intention. According to an embodiment, the NLU module 220 may determine a parameter of a user input using a word which has been used as a basis to determine a user intention. According to an embodiment, the NLU module 220 may determine a user intention using the NLU DB 221 that stores linguistic features for recognizing the intention of a user input. According to another embodiment, the NLU module 220 may determine a user intention using a personal language module (PLM). For example, the NLU module 220 may determine a user intention using personal information (e.g., a contact list and a music list). The PLM may be stored in, for example, the NLU DB 221. According to an embodiment, the NLU module 220 and the ASR module 210 may recognize a user voice based on the personal language model stored in the NLU DB 221.

According to an embodiment, the NLU module 220 may generate a path rule based on the intention of a user input and a parameter. For example, based on the intention of a user input, the NLU module 220 may select an app to be executed and may determine an action to be executed in the selected app. The NLU module 220 may determine a parameter corresponding to the determined action, and may generate a path rule. According to an embodiment, the path rule generated by the NLU module 220 may include information associated with an app to be executed, an action to be executed in the app (e.g., at least one state), and a parameter required for executing the action.

According to an embodiment, the NLU module 220 may generate a single path rule or a plurality of path rules based on the intention of a user input and a parameter. For example, the NLU module 220 may receive a path rule set corresponding to the UE 100 from the path planner module 230, and may map the intention of a user input and a parameter to the received path rule set, so as to determine a path rule.

According to another embodiment, the NLU module 220 may determine an app to be executed, an action to be executed in the app, and a parameter required for executing the action, based on the intention of a user input and a parameter, and may generate a single path rule or a plurality of path rules. For example, the NLU module 220 may arrange the app to be executed and the action to be executed in the app according to the intention of the user input in the form of ontology or a graph model, based on the information associated with the UE 100, so as to generate a path rule. The generated path rule may be stored in, for example, a path rule database (PR DB) 231 via the path planner module 230. The generated path rule may be added to a path rule set stored in the DB 231.

According to an embodiment, the NLU module 220 may select at least one of the plurality of generated path rules. For example, the NLU module 220 may select an optimal path rule from among the plurality of path rules. As another example, the NLU module 220 may select a plurality of path rules when some actions are specified based on user speech. The NLU module 220 may determine one of the plurality of path rules based on an additional input by the user.

According to an embodiment, the NLU module 220 may transmit a path rule to the UE 100 in response to a user input. For example, the NLU module 220 may transmit a single path rule corresponding to a user input to the UE 100. As another example, the NLU module 220 may transmit a plurality of path rules corresponding to a user input to the UE 100. The plurality of path rules may be generated by the NLU module 220, for example, when user speech merely specifies some actions.

According to an embodiment, the path planner module 230 may select at least one of the plurality of path rules.

According to an embodiment, the path planner module 230 may transfer a path rule set including a plurality of path rules to the NLU module 220. The plurality of path rules in the path rule set may be stored in the path rule DB 231 connected to the path planner module 230, in the form of a table. For example, the path planner module 230 may transfer, to the NLU module 220, a path rule set corresponding to information associated with the UE 100 (e.g., OS information, app information) received from the intelligence agent 151. The table stored in the path rule DB 231 may be stored, for example, for each domain or for each domain version.

According to an embodiment, the path planner module 230 may select a path rule or a plurality of path rules from the path rule set, and may transfer the same to the NLU module 220. For example, the path planner module 230 may match a user intention and a parameter against a path rule set corresponding to the UE 100 so as to select a single path rule or a plurality of path rules, and may transfer the same to the NLU module 220.

According to an embodiment, the path planner module 230 may generate a single path rule or a plurality of path rules based on a user intention and a parameter. For example, the path planner module 230 may determine an app to be executed and an action to be executed in the app based on a user intention and a parameter, and may generate a single path rule or a plurality of path rules. According to an embodiment, the path planner module 230 may store the generated path rule(s) in the path rule DB 231.

According to an embodiment, the path planner module 230 may store, in the path rule DB 231, the path rule(s) generated by the NLU module 220. The generated path rule(s) may be added to a path rule set stored in the path rule DB 231.

According to an embodiment, the table stored in the path rule DB 231 may include a plurality of path rules or a plurality of path rule sets. The plurality of path rules or the plurality of path rule sets may reflect the classification, the version, the type, or the feature of a device that performs each path rule.

According to an embodiment, the DM module 240 may determine whether a user intention recognized by the NLU module 220 is accurate. For example, based on whether parameter information is sufficient, the DM module 240 may determine whether the user intention is accurate. The DM module 240 may determine whether a parameter recognized by the NLU module 220 is sufficient to perform a task. According to an embodiment, if the user intention is inaccurate, the DM module 240 may perform a feedback that requests information that a user needs. For example, the DM module 240 may perform a feedback to request information associated with a parameter in order to recognize a user intention.

According to an embodiment, the DM module 240 may include a content provider module. If an action is executable based on a user's likely intention and a parameter recognized by the NLU module 220, the content provider module may generate a result of performing a task corresponding to a user input. According to an embodiment, the DM module 240 may transmit the result generated by the content provider module to the UE 100 in response to the user input.

According to an embodiment, the NLG module 250 may convert designated information into text. The information converted into text may be in the form of a natural language speech. The designated information may be, for example, information associated with an additional input, information indicating that an action corresponding to a user input is completed, or information indicating an additional input by a user (e.g., feedback information associated with a user input). The information converted into text may be transmitted to the UE 100 and may be displayed on the display 120, or may be transmitted to the TTS module 260 and may be converted into the form of a speech.

According to an embodiment, the TTS module 260 may convert the information in the form of text into information in the form of a speech. TTS module 260 may receive information in the form of text from the NLG module 250, may convert the information in the form of text into information in the form of a speech, and may transmit the same to the UE 100. The UE 100 may output the information in the form of a speech to the speaker 130.

According to an embodiment, the NLU module 220, the path planner module 230, and the DM module 240 may be implemented as a single module. For example, the NLU module 220, the path planner module 230, and the DM module 240 are implemented as a single module, may determine a user intention and a parameter, and may generate a response (e.g., a path rule) corresponding to the determined user intention and parameter. Accordingly, the generated response may be transmitted to the UE 100.

Figure 5:
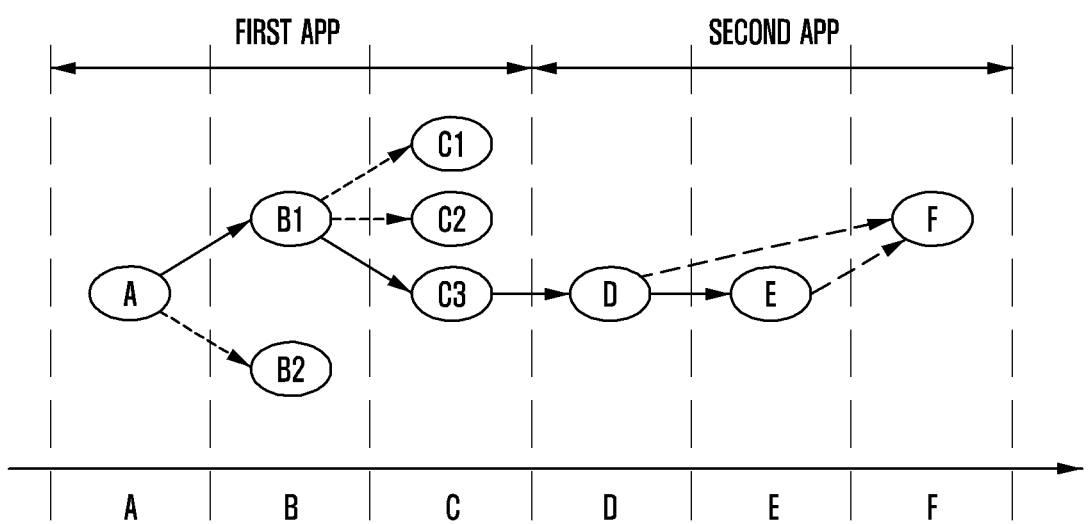
FIG. 5 is a diagram illustrating a method of generating a path rule by a natural language understanding module according to various embodiments.

FIG. 5 is a diagram illustrating a method of generating a path rule by a path planner module according to an embodiment of the present disclosure.

Referring to FIG. 5, the NLU module 220 according to an embodiment may classify the function of an app as one of the actions (e.g., state A to state F), and store the same in the path rule database (PR DB) 231. For example, the NLU module 220 may store a path rule set including a plurality of path rules (A-B1-C1, A-B1-C2, A-B1-C3-D-F, and A-B1-C3-D-E-F), each of which is classified as one of the actions (or states), in the PR DB 231.

According to an embodiment, the PR DB 231 of the path planner module 230 may store a path rule set for performing the function of an app. The path rule set may include a plurality of path rules including a plurality of actions (e.g., the sequence of states). In each of the plurality of path rules, actions to be executed may be sequentially arranged according to a parameter input for each of the plurality of actions. According to an embodiment, the plurality of path rules may be configured in the form of ontology or a graph model, and may be stored in the PR DB 231.

According to an embodiment, the NLU module 220 may select an optimal path rule (A-B1-C3-D-F) from among the plurality of path rules (A-B1-C1, A-B1-C2, A-B1-C3-D-F, and A-B1-C3-D-E-F) corresponding to the intention of a user input and a parameter.

According to an embodiment, if there is no path rule that completely matches a user input, the NLU module 220 may transfer a plurality of path rules to the UE 100. For example, the NLU module 220 may select a path rule (e.g., A-B1) that partially matches the user input. The NLU module 220 may select one or more path rules (e.g., A-B1-C1, A-B1-C2, A-B1-C3-D-F, and A-B1-C3-D-E-F) including the path rule (e.g., A-B1) that partially matches the user input, and may transfer the selected path rules to the UE 100.

According to an embodiment, the NLU module 220 may select one of the plurality of path rules based on an additional input to the UE 100, and may transfer the selected path rule to the UE 100. For example, the NLU module 220 may select one path rule (e.g., A-B1-C3-D-F) from among the plurality of path rules (e.g., A-B1-C1, A-B1-C2, A-B1-C3-D-F, and A-B1-C3-D-E-F) based on a user input additionally input to the UE 100 (e.g., an input that selects C3).

According to another embodiment, the NLU module 220 may determine a user intention and a parameter corresponding to a user input additionally input to the UE 100 (e.g., an input that selects C3) via the NLU module 220, and may transmit the determined user intention or parameter to the UE 100. The UE 100 may select one path rule (e.g., A-B1-C3-D-F) from among the plurality of path rules (e.g., A-B1-C1, A-B1-C2, A-B1-C3-D-F, and A-B1-C3-D-E-F) based on the transmitted intention or parameter.

Accordingly, the UE 100 may completely execute the actions of the app 141 or 143 according to the one selected path rule.

According to an embodiment, if a user input that provides insufficient information is received by the intelligence server 200, the NLU module 220 may generate a path rule that partially matches the received user input. For example, the NLU module 220 may transmit the partially matched path rule to the intelligence agent 151. The intelligence agent 151 transmits the partially matched path rule to the execution manager module 153, and the execution manager module 153 may execute the first app 141 according to the path rule. The execution manager module 153 executes the first app 141 and may transmit insufficient parameter information to the intelligence agent 151. The intelligence agent 151 may request an additional input from a user using the insufficient parameter information. When an additional input is received from the user, the intelligence agent 151 may transmit the same to the intelligence server 200 to process the same. The NLU module 220 may generate a path rule that is supplemented based on the intention of a user input and parameter information that are additionally input, and may transmit the same to the intelligence agent 151. The intelligence agent 151 may transmit the path rule to the execution manager module 153 and may execute the second app 143.

According to an embodiment, if a user input, some information of which has been lost, is received by the intelligence server 200, the NLU module 220 may transmit a user information request to the personal information server 300. The personal information server 300 may transmit, to the NLU module 220, information associated with a user who inputs a user input stored in the personal DB. The NLU module 220 may select a path rule corresponding to a user input, of which some information associated with actions have been lost, using the user information. Accordingly, although a user input, some information of which has been lost, is received by the intelligence server 200, the NLU module 220 may request lost information and receive an additional input or may use user information, so as to determine a path rule corresponding to the user input.

Table 1 provided below may show an example of the form of a path rule associated with a task requested by a user according to an embodiment.

TABLE 1

| Path rule ID | State | parameter |
|---|---|---|
| Gallery_101 | pictureView(25) | NULL |
| | searchView(26) | NULL |
| | searchViewResult(27) | Location,time |
| | SearchEmptySelectedView(28) | NULL |
| | SearchSelectedView(29) | ContentType, selectall |
| | CrossShare(30) | anaphora |

Referring to Table 1, a path rule that an intelligence server (e.g., the intelligence server 200 of FIG. 1) generates or selects according to user speech (e.g., "share pictures") may include at least one state (25, 26, 27, 28, 29, or 30). For example, the at least one state (e.g., any one of the actions of a UE) may correspond to at least one from among running a picture application (pictures view) 25, executing a picture search function (search view) 26, outputting a search result display screen (search view result) 27, outputting a search result display screen including no selected picture (search empty selected view) 28, outputting a search result display screen including at least one selected picture (search selected view) 29, and outputting a screen for selecting an application for sharing (cross share) 30.

According to an embodiment, the parameter information of the path rule may correspond to at least one state. For example, the parameter information may be included in the state 29 of outputting a search result display screen including at least one selected picture.

When the path rule including the sequence of the states 25, 26, 27, 28, and 29 is performed, the task ("share pictures") requested by the user may be performed.

Figure 6:
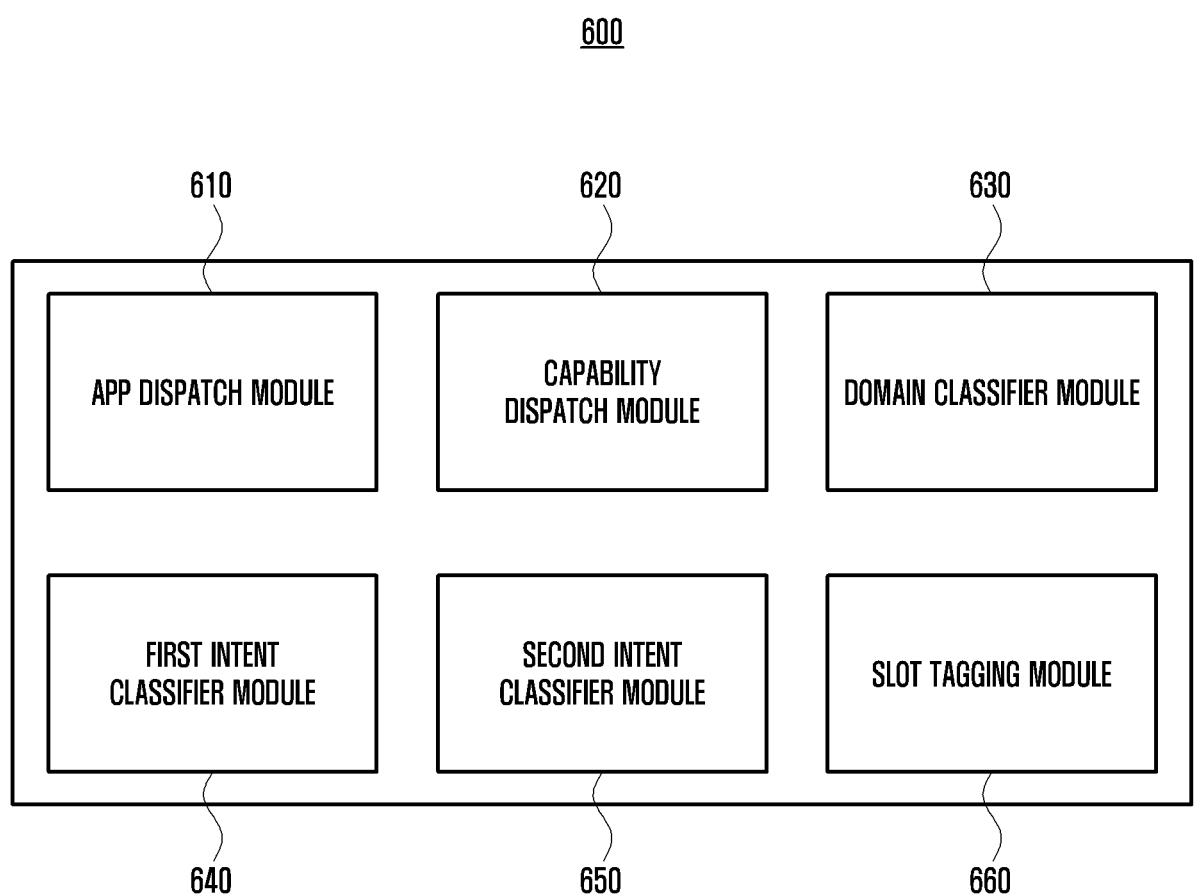
FIG. 6 is a functional block diagram of a natural language understanding module according to various embodiments.

FIG. 6 is a functional block diagram of an NLU module according to various embodiments.

Referring to FIG. 6, the NLU module 600 may include an app dispatch module 610, a capability dispatch module 620, a domain classifier module 630, a first intent classifier module 640, a second intent classifier module 650, and a slot tagging module 660. The NLU module 600 may be similar to the NLU module 220 of FIG. 4. In other words, the NLU module 600 may generate (or select) a path rule using text data corresponding to a user input (e.g., voice). The path rule may include, for example, the sequence of states of the electronic device 100.

The NLU module 600 may learn user speech and generate a model, and may generate a path rule corresponding to a user input using the generated model. The learned model may include, for example, a domain and a path rule related to the domain. The domain may correspond to an app stored in a memory of the UE 100. The domain can be the universe of applications that can perform a given task. The path rule may correspond to a designated speech. The designated speech is distinguished and identified based on a designated criterion (e.g., a designated function), whereby a path rule corresponding to a user input may be generated. Respective elements of the NLU module 600 may generate a response corresponding to a user input using different models.

The app dispatch module 610 may determine whether a designated word is included, which is used to determine an app that is to be executed or closed based on a user input. For example, the app dispatch module 610 may determine whether an app name (e.g., a gallery app or a short message service app) is included in the user input. As another example, the app dispatch module 610 may determine whether a word (e.g., exit or bye) capable of closing an app is included in the user input. After the app is closed based on the user input, another app corresponding to the user input may be executed.

When the app dispatch module 610 recognizes a designated word, a domain corresponding to a user input may be determined. In other words, the app dispatch module 610 may determine an app to perform a task corresponding to the user input, and may determine a domain corresponding to the app as the domain corresponding to the user input. Accordingly, the app dispatch module 610 may determine the domain corresponding to the user input by only determining whether a designated word is included in the user input.

The capability dispatch module 620 may select a plurality of apps capable of performing a task corresponding to a user input. For example, the capability dispatch module 620 may select a plurality of apps (e.g., a gallery app and a memory app) corresponding to the same function (e.g., an edit function).

The capability dispatch module 620 may receive a user input for selecting one of the plurality of apps. For example, the capability dispatch module 620 may transmit information associated with the plurality of apps to the UE 100, and may receive a user input for selecting one of the plurality of apps from the UE 100. Accordingly, the capability dispatch module 620 may determine a domain corresponding to the selected app as a domain corresponding to the user input.

The domain classifier module 630 may determine a domain corresponding to a user input. For example, the domain classifier module 630 may determine a domain corresponding to a user input using the linguistic features (e.g., syntactic features) of the user input, similar to the method of determining a domain by the NLU module 220 of FIG. 4.

The domain classifier module 630 may determine a domain corresponding to a user input, but it takes a longer time to determine the domain when compared to the case in which the app dispatch module 610 or the capability dispatch module 620 recognizes a designated word or function and determines a domain. Accordingly, the NLU module 600 may operates the app dispatch module 610 and the capability dispatch module 620 first, and when a domain corresponding to a user input is not determined via the app dispatch module 610 and the capability dispatch module 620, the NLG module 600 may determine the domain corresponding to the user input via the domain classifier module 630.

The first intent classifier module 640 may determine a path rule corresponding to a user input based on a rule stored in a database (or a memory). For example, the first intent classifier module 640 may determine a path rule corresponding to a user input based on a plurality of path rules related to a domain determined by the app dispatch module 610, the capability dispatch module 620, or the domain classifier module 630. The first intent classifier module 640 may determine the path rule corresponding to the user input by matching the plurality of path rules against the user input.

The second intent classifier module 650 may recognize the intention of a user input. For example, the second intent classifier module 650 may recognize (or determine) the intention corresponding to the user input using the linguistic features of the user input. As another example, the second intent classifier module 650 may recognize the intention corresponding to the user input using a personal language model (PLM). The second intent classifier module 650 may determine a path rule corresponding to the user input based on the recognized intention. For example, the second intent classifier module 650 may calculate matching rates (or confidence levels) of a plurality of path rules related to the domain determined by the app dispatch module 610, the capability dispatch module 620, or the domain classifier module 630, based on the recognized intention, and may select a path rule having the highest matching rate as the path rule corresponding to the user input.

The second intent classifier module 650 may determine one of the plurality of path rules related to a domain corresponding to an app that is running in the UE 100, as the path rule corresponding to the user input. For example, the second intent classifier module 650 may calculate matching rates of the plurality of path rules related to the domain corresponding to the app that is running in the UE 100 based on the recognized intention of the user input, and may select a path rule corresponding to the user input.

According to an embodiment, it can takes a longer time when the second intent classifier module 650 determines a path rule, when compared to the first intent classifier module 640. However, the second intent classifier module 650 may improve the accuracy of the selection of a path rule. Accordingly, the NLU module 600 may determine whether the path rule determined by the first intent classifier module 640 corresponds to a designated path rule (e.g., full path rule) first, and when the determined path rule is different from the designated path rule, the NLU module 600 may determine a path rule corresponding to the user input via the second intent classifier module 650.

The slot tagging module 660 may extract a parameter required for a state included in a path rule. For example, the slot tagging module 660 may extract a parameter required for a state included in a path rule determined by the first intent classifier module 640 or the second intent classifier module 650 from the words included in a user input, and may tag the extracted parameter to the state.

When the domain of the user input is not determined via the elements, the NLU module 600 may receive a user input that selects an app to be executed from a user, so as to determine a domain. For example, the NLU module 600 may transmit, to the UE 100, guidance information in order to receive a user input that select an app to be executed. The guidance information for receiving the user input may be generated by, for example, the NLG module 250.

The NLU module 600 may determine a path rule corresponding to a user input. In order to determine a path rule corresponding to a user input from among a plurality of path rules stored in a DB, the NLU module 600 may classify the plurality of path rules stored in the DB based on a domain corresponding to an app, and may set path rules respectively corresponding to a plurality of user speeches for executing the functions of apps.

Figure 7:
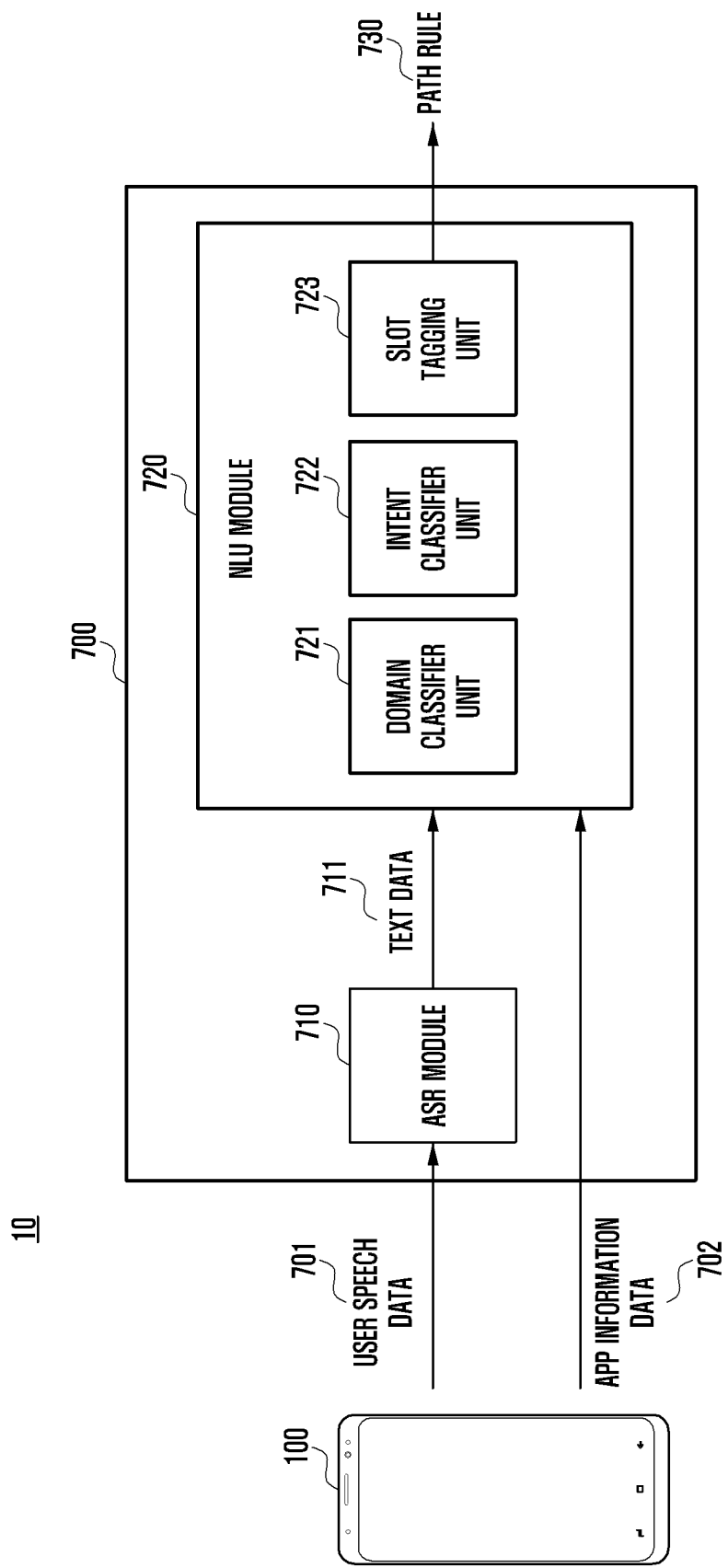
FIG. 7 is a diagram illustrating an integrated intelligent system according to various embodiments.

FIG. 7 is a diagram illustrating the integrated intelligent system 10 according to various embodiments of the present disclosure. A server 700 of FIG. 7 may include at least one server. For example, the server 700 of FIG. 7 may include at least one of the intelligence server 200, the personal information server 300, and the proposal server 400 of the intelligent system 10 of FIG. 1. Also, the server 700 of FIG. 7 may include a cloud server including a plurality of servers.

The server 700 may receive user input data 701 (e.g., user speech data) related to a user input that requests the execution of a task from the UE 100, and may receive app information data 702 (or application information data) including information associated with a plurality of apps (or application programs) executed in the UE 100.

The plurality of apps may include an app that is running in the foreground (hereinafter, a foreground app) when a user input is provided. The foreground app may indicate an app that is displayed on the current screen.

Also, the plurality of apps may include apps, excluding an app that is currently displayed in the foreground, when a user input is provided. The apps excluding the application that is currently in the foregoing may include, for example, an app that is running in the background (hereinafter, a background app). The background app may include an app of which the execution screen is not displayed on the display although the operation is executed, or an app of which the execution screen is displayed as the brief information such as a status bar icon, a popup, a notification screen, a widget, or the like. Also, the previously executed app may include a paused app. The paused app may indicate an app that is temporarily paused while the app runs. For example, when a parameter required for a subsequent action of an app is not input, the app may be paused and may stay in an idle state. Also, the previously executed apps may include an app that is closed in the UE 100 within a predetermined period of time. The app closed within the predetermined period of time may include, for example, an app that is forcibly closed in response to a user request, or an app that was automatically closed predetermined number of minutes ago (e.g., one to five minutes ago) since a task is completely performed.

Also, the app information data including information associated with an app may include at least one from among the identifier of the app (e.g., the name of the app, the unique ID of the app, or the like), the recent operation information of the app, a path rule including the recent operation of the app, execution screen information associated with the recent operation of the app, and hierarchical structure information corresponding to the recent operation of the app. In this instance, the execution screen information, a path rule including the execution screen information, and hierarchical structure information of the app are matched to each other, and may be stored in the server 700 in advance. For example, when execution screen information is received from the UE 100 as app information data, the server 700 may additionally obtain a path rule or hierarchical structure information that matches the execution screen, and may use the same as another piece of app information data.

When speech data 701 associated with user speech is received as user input data, an automatic speech recognition (ASR) module 710 of the server 700 may convert the received user speech data 701 into text data 711, and may transmit the same to a natural language understanding (NLU) module 720. The ASR module 710 may include the above-described ASR module 210 of FIG. 4.

The NLU module 720 of the server 700 may determine (or predict, generate, estimate, or recognize) a path rule 730 including the sequence of states of the UE 100, based on the text data and app information data. The NLU module 720 of FIG. 7 may include a domain classifier unit 721, an intent classifier unit 722, and a slot tagging unit 723.

The domain classifier unit 721 may determine a domain related to a task requested by a user. The domain classifier unit 721 may include at least one from among the app dispatch module 610, the capability dispatch module 620, and the domain classifier module 630, which have been described in FIG. 6.

The domain classifier unit 721 may determine at least one domain that corresponds to a user's likely intention based on app information data and user input data received from the UE 100. For example, the domain classifier unit 721 may determine one or more domains by taking into consideration app information data, words included in the user data, the linguistic features of a user, and the like.

The intent classifier unit 722 may determine the path rule 730 related to a task requested by the user from among a plurality of path rules related to a domain determined by the domain classifier unit 721. The intent classifier unit 722 may include at least one from among the first intent classifier model 640 and the second intent classifier model 650 which have been described in FIG. 6. The intent classifier unit 722 may recognize (determine, predict, generate, or estimate) a user intention corresponding to a user input. The intent classifier unit 722 may determine the path rule 730 including the sequence of states of the UE 100, based on the recognized user intention. For example, the intent classifier unit 722 may calculate a confidence level of each of the plurality of path rules related to a domain determined by the domain classifier unit 721. The intent classifier unit 722 may determine a path rule having the highest confidence level from among a plurality of path rules having confidence levels greater than a predetermined reference, as the path rule 730 related to the task. The path rule 730 may include the sequence of states of the UE 100.

The slot tagging unit 723 may extract parameters required for the operation states of the path rule 730 determined by the intent classifier unit 722. The slot tagging unit 723 may include the slot tagging module 660 which has been described in FIG. 6.

According to various embodiments, by preferentially taking into consideration an app that is displayed on the current screen, the server 700 may predict a path rule related to a domain including the app. In this instance, the app currently displayed on the screen may be a foreground app. The server 700 may calculate the confidence level of the predicted path rule, and determine whether the likely intention of a user who requests the performance of a task corresponds to a proposed intention to perform the task with respect to the app that is running on the current screen, based on the calculated confidence level. For example, when the calculated confidence level exceeds a predetermined reference value, the server 700 may determine a path rule related to a domain, with respect to the foreground app. Conversely, when the calculated confidence level is less than or equal to the predetermined reference value, the server 700 may determine a path rule related to a domain, with respect to the other apps that are previously executed.

According to various embodiments, the server 700 may enable the NLU module 720 to perform learning, so as to generate or update a learning model, and may predict a path rule related to a domain using the generated or updated learning model. In this instance, an entity of learning data, which is used when the NLU module 720 performs learning, may include, for example, {user speech data, information associated with a foreground app, information associated with a first background app, information associated with a second background app, the identifier of an app where a task is performed, and a path rule that executes a task}.

When the learning model is generated or updated, the NLU module 720 may determine a path rule related to a domain using the generated learning model. In this instance, an entity of recognition data, which is used for the learning model may include, for example, {user speech data, information associated with a foreground app, information associated with a first background app, and information associated with a second background app}.

The server 700 may obtain a domain where a task is to be performed (or an app corresponding to a domain) and a path rule related to the domain, as a result of recognizing the learning model corresponding to the recognition data.

According to various embodiments, when the server 700 determines a path rule using information associated with a plurality of apps, the server 700 may obtain information associated with an app, excluding a foreground app that is currently displayed on a screen, selectively or as occasion requires.

For example, the server 700 may receive, in advance, both information associated with an app that is currently displayed on a screen (e.g., an app that is running on the foreground) when a user input, that is, user input data that requests performance of a task, is provided, and information associated with an app besides the app that is executed in the foreground (e.g., an app that is in an active state in the background, a paused app, and an app is closed within a predetermined period). The server 700 may determine a path rule using at least one from among information associated with the foreground app and information associated with previously executed app. In this instance, if the confidence level of a path rule associated with the foreground app is less than or equal to a predetermined level, the server 700 may determine a path rule for performing the task using information associated with the previously executed app that is received in advance. In this instance, additionally requesting information associated with the previously executed app from the UE 100 is omitted, and thus, the server 700 may reduce a delay time expended in determining a path rule.

According to various embodiments, the server 700 may preemptively obtain information associated with an app that is currently displayed on the screen when a user input is provided, together with user input data. With respect to the app that is currently displayed on the screen, the server 700 may predict a path rule related to a domain including the app via the intent classifier unit 722. In this instance, if the confidence level of the predicted path rule is less than or equal to a reference value, the intent classifier unit 722 may request additional app information from the UE 100. An agent module of the UE 100 that is requested to provide the additional app information may generate an app information list including information associated with other apps besides the app executed in the foreground, and may transmit the same to the server 700. The intent classifier unit 722 of the server 700 may predict path rules included in domains respectively corresponding to the apps included in the app information list, using information associated with the apps included in the app information list and user speech data. The intent classifier unit 722 may determine a path rule having the highest confidence level from among the predicted path rules as a path rule related to the task.

Figure 8:
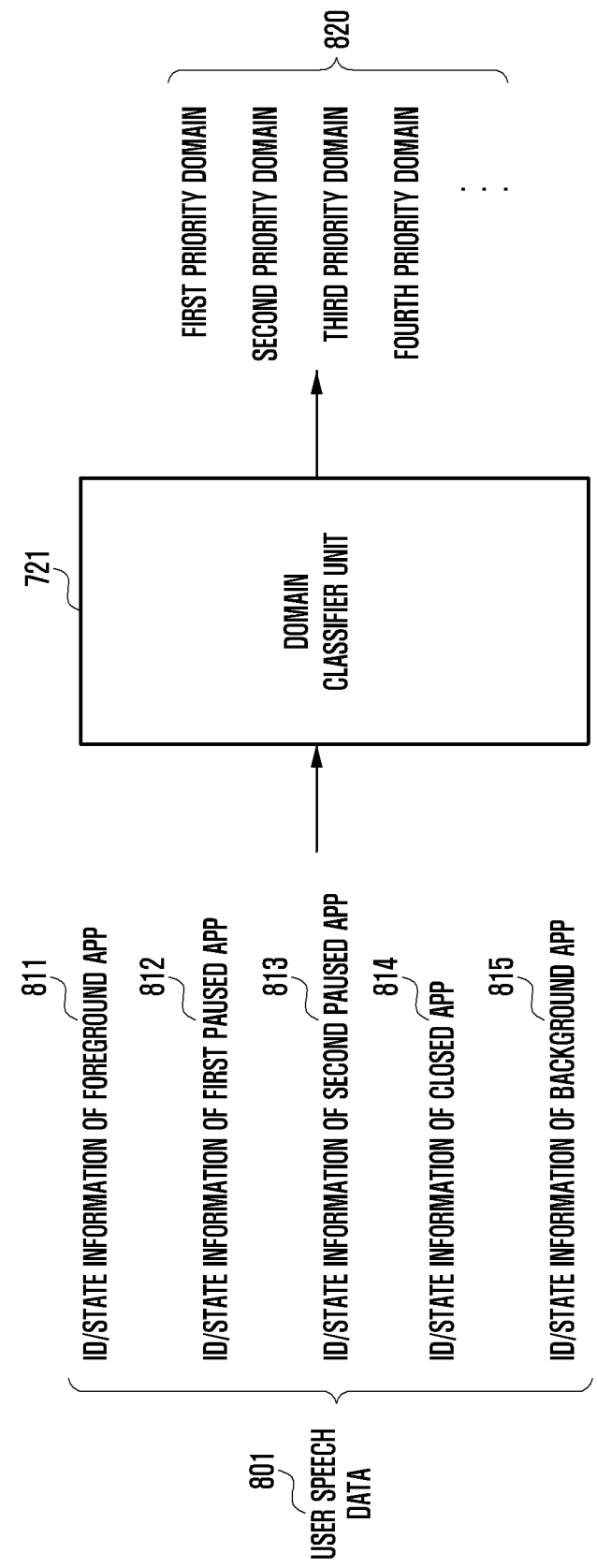
FIG. 8 is a diagram illustrating input/output data of a domain classifier unit according to various embodiments.

FIG. 8 is a diagram illustrating input/output data of a domain classifier unit according to various embodiments of the present disclosure.

In FIG. 8, the domain classifier unit 721 may include user input data (e.g., user speech data) 801 and information associated with a plurality of apps executed in a UE.

In FIG. 8, the information associated with the plurality of apps may include the identifier of a foreground app and state information 811 of the foreground app. In this instance, the state information may include, for example, recent operation information of an app, a path rule including the recent operation information of an app, execution screen information associated with execution of the recent operation of an app, hierarchical structure information corresponding to the recent operation of an app, and the like.

Also, the information associated with the plurality of apps may include the identifier of a first paused app and state information 812 of the first paused app. Also, the information associated with the plurality of apps may include the identifier of a second paused app and state information 813 of the second paused app. Also, the information associated with the plurality of apps may include the identifier of a closed app and state information 814 of the closed app. Also, the information associated with the plurality of apps may include the identifier of a background app and state information 815 of the background app.

In this instance, at least two pieces of information from among the information associated with the plurality of apps executed in the UE may be included in the domain classifier unit 721. In this instance, one piece of the information associated with two or more apps may be information associated with a foreground app.

The domain classifier unit 721 may determine a plurality of candidate domains 820 used to perform a task, based on user input data and information associated with a plurality of apps.

According to various embodiments, the information associated with the plurality of apps used by the domain classifier unit 721 may be assigned with a weight based on the state of each of the plurality of apps. For example, the highest weight may be applied to a foreground app, and successively lower weights may be applied in order of a background app, a paused app, and a closed app (although other orders are possible). Accordingly, a domain that includes a foreground app from among the plurality of candidate domains may have a high probability of being determined as a domain with the highest priority from among the candidate domains 820. However, the domain including the foreground app may not be necessarily determined to be a domain that is to perform a task. For example, if the foreground app is an email app and the task requested is routing direction, clearly the email app would not be determined to be the domain for performing the task, because the email app may be incapable of performing the task.

According to various embodiments, a plurality of applications (or a plurality of apps) may be included in a single domain. In this instance, the server 700 may identify whether apps executed in the UE 100 are included in for each domain, and may determine an app to perform a task associated with a user request.

Particularly, the domain classifier unit 721 may learn a learning model to be used for classifying domains, using information associated with domains. In this instance, text data corresponding to user speech together with the information associated with domains may be used for learning. The domain classifier unit 721 may determine candidate domains to perform a task based on user input data. When candidate domains are determined, the domain classifier unit 721 may determine an app related to a task requested by a user, using information associated with an app. For example, whether a domain with the highest priority from among the candidate domains includes a foreground app may be determined. When the foreground app is included, the domain classifier unit 721 may determine the foreground app as an app where the task is to be performed. Conversely, when the foreground app is not included, the domain classifier unit 721 may determine whether the domain with the highest priority includes a background app. When the background app is included, the domain classifier unit 721 may determine the background app as an app where the task is to be performed. Conversely, when the background app is also not included, the domain classifier unit 721 may sequentially determine whether a paused app is included in the domain with the highest priority, and whether a closed app is included.

When all of the apps executed in the UE 100 are not included in the domain with the highest priority, the domain classifier unit 721 may sequentially perform identification with respect to each of the apps executed in the UE 100 so as to identify whether an app is included in a domain with a second highest priority, and may determine an app where the task is to be performed.

Figure 9:
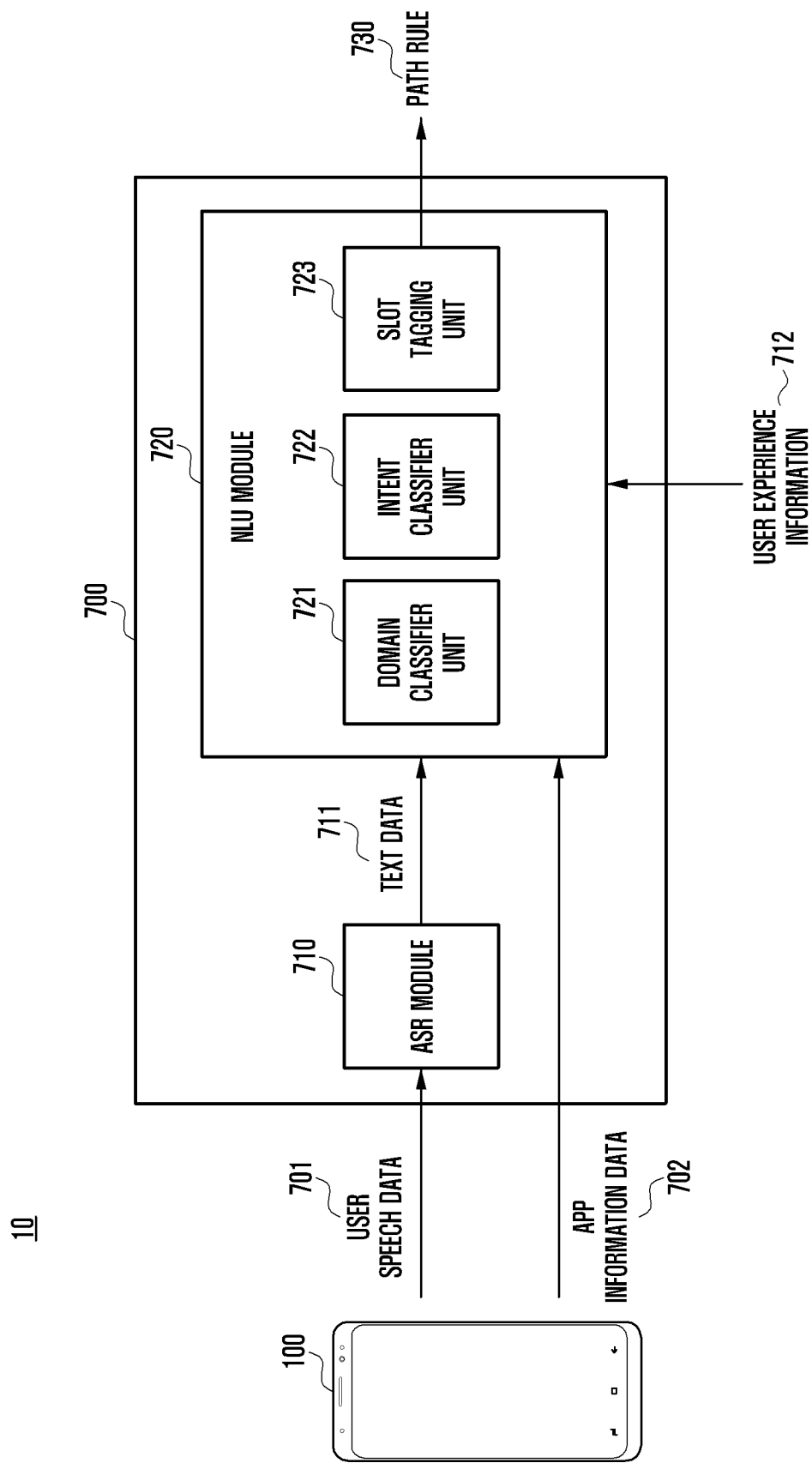
FIG. 9 is a diagram illustrating an integrated intelligent system according to various embodiments.

FIG. 9 is a diagram illustrating an integrated intelligent system using user experience information 712 according to various embodiments.

The descriptions of the elements corresponding to the server 700 of FIG. 8, which have been described above will be omitted in the descriptions of the elements of the server 700 of FIG. 9.

In FIG. 9, the server 700 may determine a path rule to perform a task using user experience information 712. The user experience information may include history of execution performed based on a user input in the UE 100. For example, the user experience information may include user input data input into the UE 100 (e.g., speech data or text data obtained by recognizing speech data), operation information of the UE 100 when the user input data is provided, state information of an app executed in the UE 100, function information corresponding to a user input, and the like. Also, the user experience information may include a path rule that matches the operation information, the state information of the app, and the like. The user experience information may be stored in at least one of the server 700 and the UE 100.

According to various embodiments, when a user input that requests performance of a task is received, the UE 100 may transmit, to the server 700, user input data related to the user input and information associated with an app (e.g., app context information). The server 700 may determine a path rule to perform a task, and may transmit the determined path rule to the UE 100. In this instance, when a user intention is a user's likely intention to perform a task with respect to a previously executed app, excluding an app that is currently displayed on a screen, the server 700 may determine a path rule related to a domain including an app appropriate for the user intention, using the user experience information. In this instance, the user experience information may include, for example, previous speech data (e.g., voice data or text data) that a user previously speaks and a path rule corresponding to the previous speech data.

The server 700 may compare user input data received from the UE 100 and previous speech data included in the user experience information. Upon comparison, when the user input data and the previous speech data are the same or similar to each other, the server 700 may determine a path rule corresponding to the previous speech data as a path rule to perform the task.

Since there are various types of user speech exist, the server 700 may not directly use user input data, but change the user input data into representative text which is suitable for comparison, and may compare the text with previous speech data. For example, a path rule that matches for each representative text is included in user experience information. In this instance, the server 700 may change user input data into representative text, and may obtain a path rule corresponding to the representative text from the user experience information. The server 700 may determine the obtained path rule as a path rule to perform the task.

As another example, the user experience information may include a path rule corresponding to user speech habit that a user frequently uses. For example, a user may speak "shoot Tom a text that we will visit him" via the UE 100. In this instance, the meaning of "shoot" that the user speaks is closer to the meaning of "send a text message", than the literal meaning of "shoot". If a user has ever spoken a term "shoot" and has executed a path rule that sends a text message as an alternative path rule corresponding to the term, the user experience information may include the path rule that sends a text message as a path rule that matches user speech habit of "shoot".

According to various embodiments, the user experience information may include user input data (e.g., speech data). Also, the user experience information may include combination information of a foreground app and a previously executed app (e.g., a background app, a paused app, and an app closed within a predetermined period). The combination information may include information associated with apps executed in the UE 100 when user speech is input, information associated with a relationship among the apps, or priority order information of the apps, and the like.

For example, while a user listens to music via a music app as a background app, and searches the internet via an Internet app as a foreground app, the user may speak "lower the sound". In this instance, if a path rule corresponding to user speech data with respect to the foreground app is not predicted or if the confidence level of the path rule is less than or equal to a predetermined reference, the UE 100 may provides a feedback indicating "lowering the sound on the Internet is not allowed". Accordingly, the user may switch the Internet execution screen to the wallpaper, and may execute the music app and directly lower the sound.

In this instance, the execution state of a music domain that "reproduces music" and the execution state of an Internet domain that "displays an Internet screen" may be generated as combination information. At least two or more from among the combination information, user speech data of "lower the sound", and the path rule that lowers the sound in the music domain may be connected to (or paired with) each other, and may be stored as user experience information. In this instance, an artificial intelligence-based learning model may be generated using at least two or more from among the execution state of the music domain, the execution state of the Internet domain, the speech data, and the path rule as learning data.

According to various embodiments, user experience information (e.g., which can include user usage information and information regarding the past usage patterns by the user, statistics such as how often a user uses an app, how long a user uses an app, time of day that a user most frequently uses the app) may be stored in the server 700. For example, the user experience information may be stored in the personal information server 300 of FIG. 1. For example, the intelligence agent 151 of the UE 100 may transmit, to the server 700, combination information of domains when user speech is provided, speech data in the state in which the domains are combined, and an alternative path rule corresponding to the speech data. The server 700 may store the received information in a database as user experience information and may manage the same.

When app information data including combination information and data related to user speech is received from the UE 100, the server 700 may voice-recognize the data related to the user speech via the ASR module 710, and may change the data into text data. The server 700 may input the text data and app information data to the NLU module 720. The NLU module 720 may recognize a likely user intention based on the text data and app information data, and may determine a path rule to perform a task.

As another example, the server 700 may determine a path rule to perform a task based on user experience information. The server 700 may change the format of text data which is the result of voice recognition performed by the ASR module 710, so as to compare the text data with representative text data of the user experience information. Subsequently, the server 700 may compare text data in the changed format with user experience information stored in a persona database. The persona database may manage user experience information for each user account. The server 700 may compare at least one of the text data in the changed format, app information data, and user account information with experience information stored in the persona database, and may obtain user experience information that matches the text data in the changed format, the app information data, and the user account information. When user experience information is obtained, the server 700 may determine a path rule included in the user experience information as a path rule to perform a task.

The server 700 may determine one path rule from among a first path rule obtained via the NLU module 720 and a second path rule obtained using user experience information as a final path rule to perform a task. For example, the server 700 may compare the confidence level of the first path rule and the confidence level of the second path rule, and may determine a path rule having a higher confidence level as the final path rule. When the server 700 transmits the determined final path rule to the UE 100, the UE 100 may perform operation according to the received path rule.

According to an embodiment, the UE 100 may determine a path rule to perform a task based on user experience information.

The user experience information may be included in a persona database of the UE 100 that stores user information (or personal information). The persona database may include, for example, the persona database stored in the memory 140 of the UE 100 of FIG. 2.

The processor 150 of the UE 100 may include a persona manager that manages the persona database. The persona manager may include, for example, the persona module 155b of the UE 100 of FIG. 2. When combination information of connected domains and an alternative path rule corresponding to speech data in the state in which the domains are combined are received from the intelligence agent 151, the persona manager may store the combination information of the domains, user speech data, and the alternative path rule in the persona database as user experience information. When the intelligence agent 151 requests, the persona manager may retrieve a path rule corresponding to input speech data and may provide the retrieved path rule to the intelligence agent 151. In this instance, the path rule corresponding to the input speech data may include a path rule that matches combination information that is the same as, or similar to the combination information of domains when the input speech data is provided.

The UE 100 may detect the end point of user speech (end point detection (EPD)) in order to determine a path rule. In order to detect the end point of a speech, the UE 100 may determine whether a predetermined period of time elapses after user speech is provided, and whether an input indicating the end is received. Also, the UE 100 may analyze input user speech data, and may determine whether the user speech is finished.

When the end point of the user speech is determined, the UE 100 may transmit the user speech data to the server 700. The server 700 may recognize the user speech data via the ASR module 710, and may transmit a recognition result to the UE 100. The UE 100 may continuously receive a recognition result associated with speech data while the user provides speech.

When the recognition result associated with the user speech is received, the UE 100 may change the format of text data corresponding to the user speech, so as to match representative text data included in user experience information. For example, a formatting manager of the intelligence agent 151 may change the format of voice-recognized text. As another example, the server 700 may recognize user speech, and may change the format of voice-recognized text. In this instance, the server 700 may change the text data into representative text data. The server 700 may receive the execution state of a domain that is currently executed in the UE 100 when user speech is provided or may receive a path rule related to the domain, and the server 700 may change text data into representative text data using the received information.

When the recognition result associated with the user speech is changed into representative text data, the UE 100 may determine a path rule that matches the representative text data based on user experience information. When the path rule is determined, the UE 100 may perform operation according to the determined path rule.

According to various embodiments, the NLU module 720 of the server 700 may learn user speech and generate a learning model, and may determine a user intention using the generated model. The server 700 may generate a path rule corresponding to a user input using a user intention and information associated with a plurality of apps. In this instance, the server 700 may configure a network of the learning model by adding noise such that the learning model robustly operates.

For example, the server 700 may take into consideration an object to which noise is to be added. For example, the server 700 may selectively add noise to the state information of each layer, based on layer information. The state information of each layer may include, for example, information associated with a screen that is currently displayed. The information associated with a screen may include, for example, a user interface (UI) associated with an execution screen, a parameter required for displaying the state of a screen, and environment information of the UE 100 (e.g., configuration information and information associated with a connection to another device), and the like.

Respective operations executed by a path rule may be configured via the transference of states. Accordingly, the states included in the path rule may be hierarchically configured, such as a menu tree. Particularly, the depth and the number of layers may be different for each domain. For example, a camera domain has seven state layers, and a message domain has 17 state layers. In this instance, the scope that a state layer may cover may be different for each level. For example, in the case of the camera domain, state layers corresponding to first, second, and third levels may occupy 25.4% of the domain. In the case of the Internet domain, the state layers corresponding to first, second, and third levels may occupy 66.9%. Therefore, the server 700 may need to add noise by taking into consideration layer information such as the depth of each layer and the number of layers for each domain.

When the layer information is utilized, the server 700 may randomly add noise for each layer, may add noise by limiting the scope to a predetermined layer, may add noise excluding the last leaf node, or may proportionally add noise for each state layer included in a domain.

When randomly adding noise, the server 700 may add noise to the whole layers irrespective of the depth of each layer. Alternatively, the server 700 may add noise up to a predetermined layer, or may add noise to a predetermined layer. Alternatively, the server 700 may add noise excluding a predetermined layer (e.g., the top layer or the last node). Alternatively, the depth of each layer is different for each type of domain, the server 700 adaptively add noise by taking into consideration a ratio of each layer to the entire layers.

As another example, the server 700 may take into consideration the number of times noise is added. For example, the server 700 may add noise by adding noise a predetermined number of times for state information. When fixed number of noises are added, the effect of noise may be different depending on the size of state information. When the size of state information is small, the effect of noise may be small. When the size of state information is large, the effect of noise may be great. Accordingly, the server 700 may add noise in proportion to the size of state information. For example, the server 700 may reduce the number of noises to be added if the size of the state information is small, and may increase the number of noises to be added if the size of the state information is large. Accordingly, the ratios of noise for domains having the same hierarchical structure are different depending on the size of state information, whereby the robustness of a learning model may be strengthen.

Figure 10:
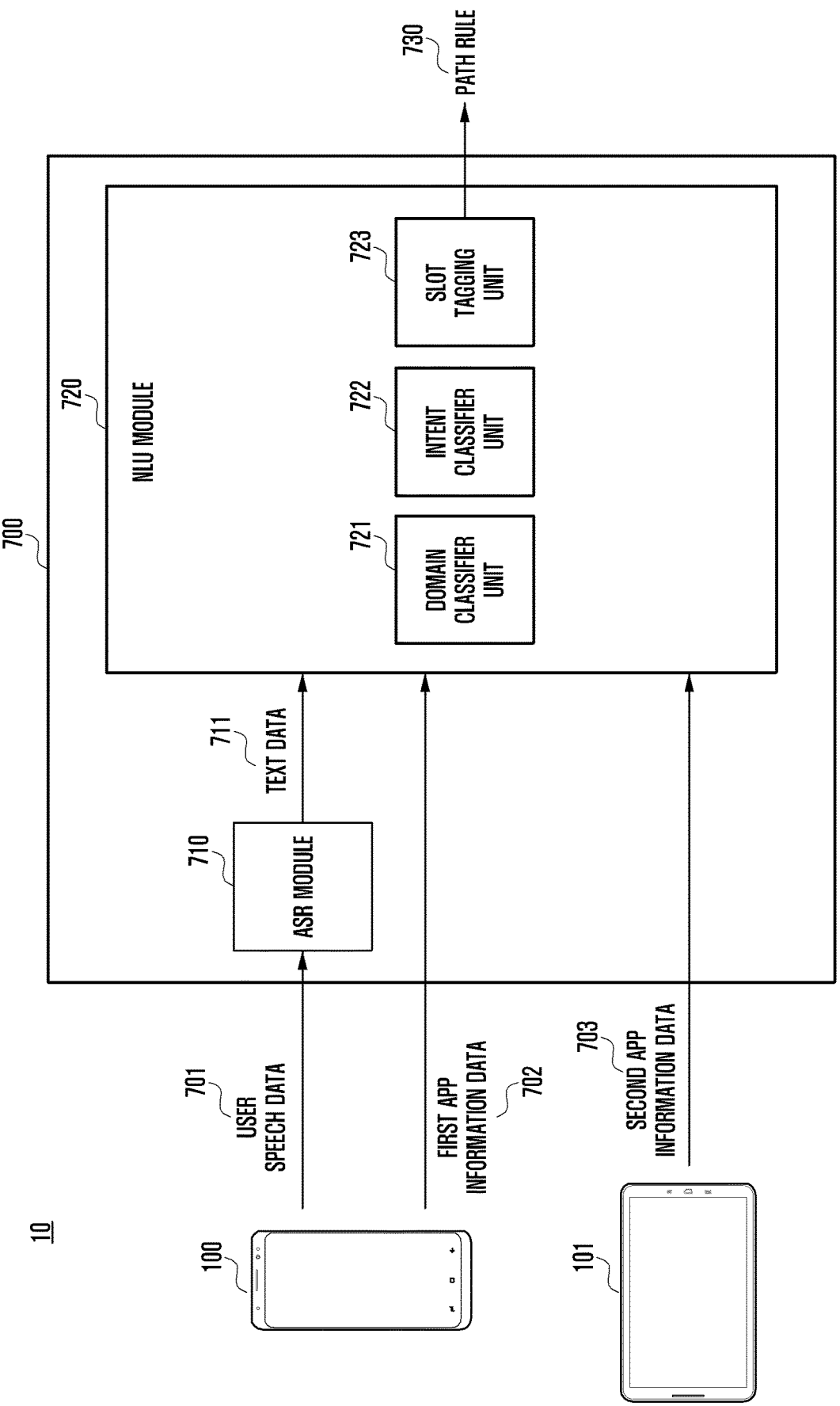
FIG. 10 is a diagram illustrating an integrated intelligent system according to various embodiments.

FIG. 10 is a diagram illustrating an integrated intelligent system according to various embodiments.

The descriptions of the elements corresponding to the server 700 of FIG. 8, which have been described above will be omitted in the descriptions of the elements of the server 700 of FIG. 10.

In FIG. 10, the server 700 may receive the user speech data 701 related to a user input and the first app information data 702 including information associated with a first application program from the first external device 100. In this instance, the first application program includes a foreground app that is running when a user input is provided in the first external device, or a app other than the foreground app (e.g., a background app, a paused app, and an app closed within a predetermined period).

Also, the server 700 may receive the second app information data 703 including information associated with a second application program from a second external device 101 related to the first external device 100. In this instance, the second application program includes a foreground app that is running or another app (e.g., a background app, a paused app, and an app closed within a predetermined period) in the second external device 101 when a trigger signal, which is associated with a user input from the first external device 100, is received from the first external device 100.

Here, the second external device 101 related to the first external device 100 indicates an external device that is used by the same user who uses the first external device 100. Alternatively, the second external device 101 related to the first external device 100 indicates an external device that is used by a user account which is the same as a user account of the first external device 100. Alternatively, the second external device 101 related to the first external device 100 indicates an external device that is used by a third party who has at least a predetermined level of the right or whom is approved by a user who uses the first external device 100.

In various embodiments, the second external device can include by way of example and not limitation, a wearable device, such as a smartwatch.

In FIG. 10, the domain classifier unit 721 of the server 700 may determine a domain to perform a task associated with a user input, using the text data 711 obtained by voice-recognizing the user speech data 701, the first app information data 702, and the second app information data 703. For example, the domain classifier unit 721 may receive the first app information data including information associated with a plural of application programs from the first external device 100, may receive second app information data 703 including information associated with a plurality of application programs from the second external device 101, and may determine a domain to perform a task associated with a user input, based on the received first app information data 702 and second app information data 703.

The intent classifier unit 722 may determine the path rule 730 related to the task from among a plurality of path rules related to a domain determined by the domain classifier unit 721. The slot tagging unit 723 may extract parameters required for the states included in the path rule 730 determined by the intent classifier unit 722.

Figure 11:
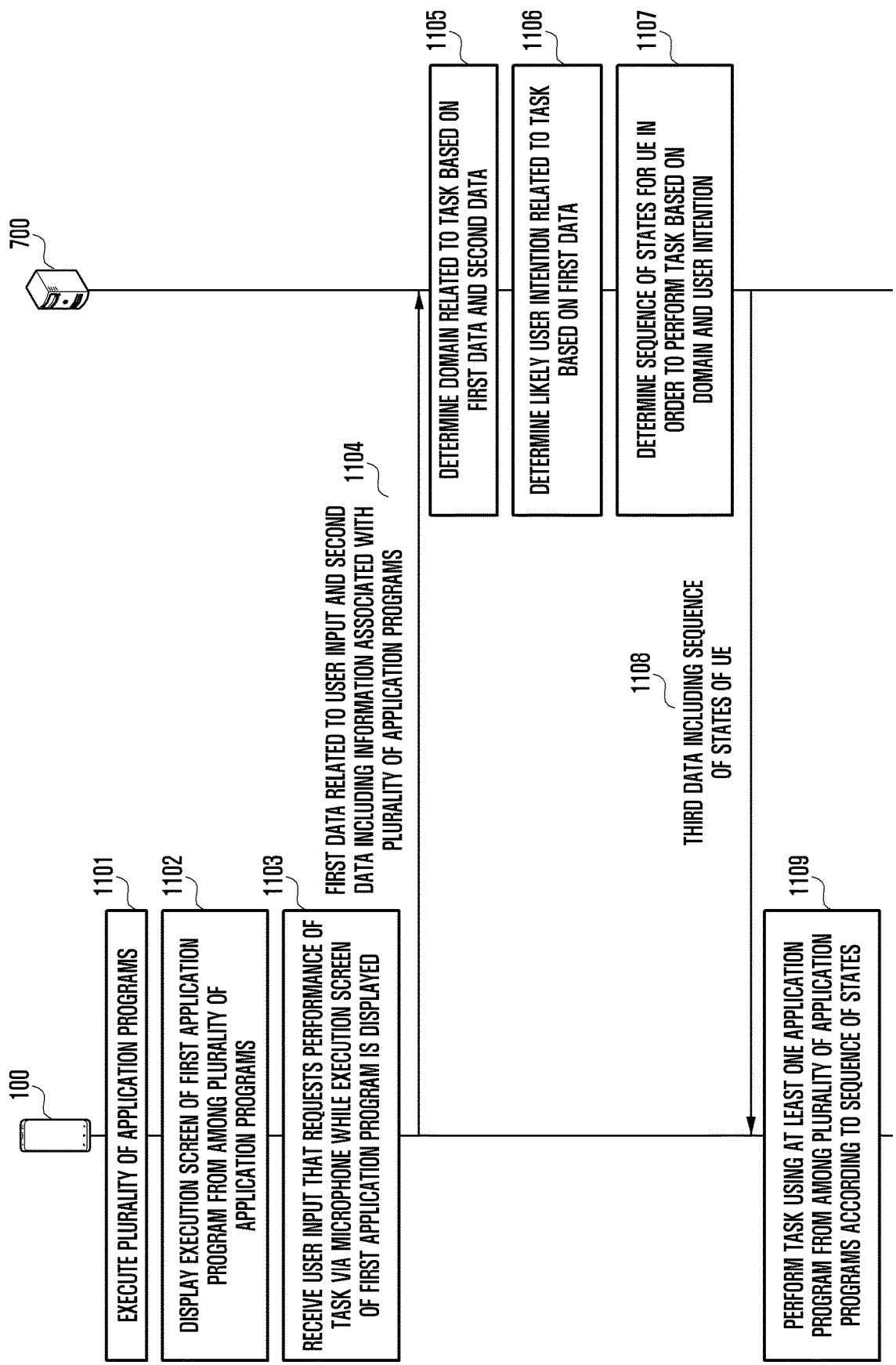
FIG. 11 is a diagram illustrating signal flow between a UE and a server according to various embodiments

FIG. 11 is a diagram illustrating signal flow between a UE and a server according to various embodiments.

The UE 100 may execute a plurality of application programs in operation 1101. In this instance, the UE 100 may display the execution screen of a first application program from among the plurality of application programs in operation 1102. The first application program may be, for example, an application program that is running in the foreground.

In the state in which the execution screen of the first application program is displayed, the UE 100 may receive a user input that requests the performance of a task via a microphone in operation 1103.

Upon reception of the user input, the UE 100 may transmit first data related to the user input and second data including information associated with the plurality of application programs to an external server in operation 1104.

In this instance, the plurality of application programs may include the first program that is running in the foreground and a second application program. The second application program may include, for example, an application program that is running in the background, a paused application program, or an application program that is closed within a predetermined period.

The server 700 may receive the first data related to the user input that requests the performance of the task, from the UE 100. Also, the server 700 may receive the second data including the information associated with the plurality of application programs from the UE 100.

The server 700 may determine a domain related to the task, based on the first data and the second data in operation 1105.

According to various embodiments, if the server 700 receives third data including information associated with at least one application program from another UE (not illustrated), the server 700 may determine the domain related to the task based on the first data and the second data received from the UE 100, and the third data received from the other UE.

According to various embodiments, the server 700 may determine the domain related to the task, based at least one piece from among user information associated with a user who uses the UE 100 and user experience information including a history of execution performed by a user input in the UE 100.

Also, the server 700 may determine a likely user intention associated with the task, based on the first data received from the UE 100 in operation 1106.

The server 700 may determine the sequence of the states of the UE 100 in order to perform the task, based on the determined domain and the likely user intention in operation 1107.

Subsequently, the server 700 may transmit third data including the determined sequence of the states of the UE 100 to the UE 100 in operation 1108.

The UE 100 may receive the sequence of the states. The UE 100 may perform the task using at least one application program from among the plurality of applications, according to the sequence of the states in operation 1109.

According to various embodiments, if the server 700 receives data including information associated with at least one application program from another UE (not illustrated), the server 700 may determine the sequence of the states for the UE 100 or the other UE (not illustrated) in order to perform the task. The server 700 may transmit the determined sequence of the states to the UE 100 or the other UE.

Figure 12:
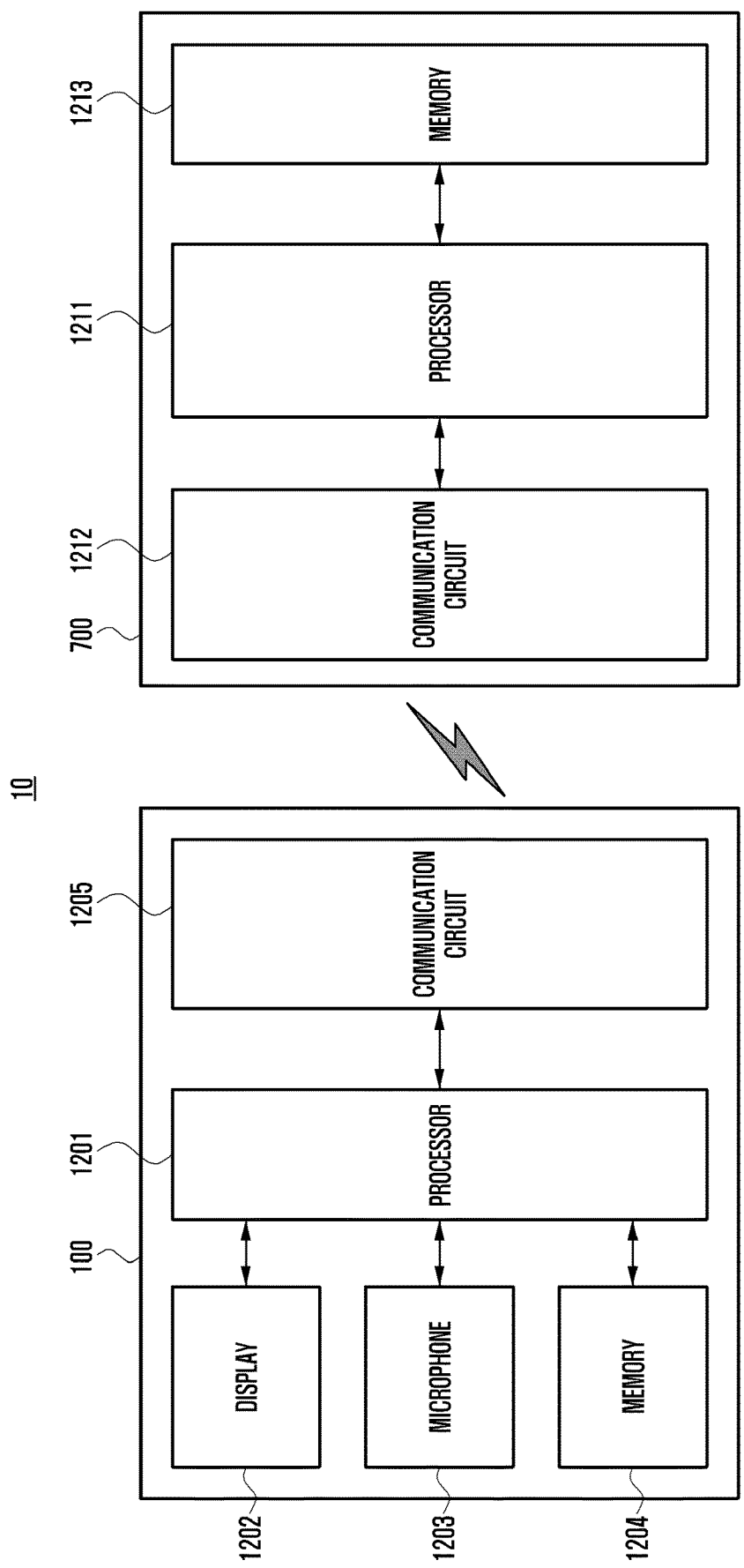
FIG. 12 is a block diagram illustrating an integrated intelligent system according to various embodiments.

FIG. 12 is a block diagram illustrating an integrated intelligent system according to various embodiments.

In FIG. 12, the integrated intelligent system 10 may include the UE 100 and the server 700.

The UE 100 may include a processor 1201, a display 1202, a microphone 1203, a memory 1204, and a communication circuit 1205.

The display 1202 may be exposed via a first part of the housing of the UE 100. The display 1202 may display the execution screen of an application program that is executed by the processor 1201. The detailed structure and operation of the display 1202 may correspond to the display 120 of FIG. 2 which has been described above and a display device 1960 of FIG. 13 which will be described later, and thus, the overlapping descriptions will be omitted.

The microphone 1203 may be exposed via a second part of the housing. The microphone 1203 may convert a user input that request the performance of a task into a digital signal, and may transfer the same to the processor 1201. The detailed structure and operation of the microphone 1203 may correspond to the microphone of the input module 110 of FIG. 2 which has been described above and a microphone of an input device 1950 of FIG. 13 which will be described later, and thus, the overlapping descriptions will be omitted.

The memory 1204 may store a plurality of application programs executable by the UE 100. Also, the memory 1204 may store first data related to a user input and second data including information associated with a plurality of application programs executed in the UE 100, which are to be transmitted to the server 700.

According to various embodiments, the memory 1204 may store instructions configured to enable the processor 1201 to perform operations when the UE 100 operates, the operations including: displaying the execution screen of a first application program from among the plurality of application programs on the display 1202; receiving a user input that requests the performance of a task via the microphone 1203 while the execution screen of the first application program is displayed; transmitting, to the server 700 via the communication circuit 1205, the first data related to the user input and the second data including information associated with the plurality of application programs; receiving, from the server 700 via the communication circuit 1205, third data including the sequence of states of the UE 100 in response to the transmission of the first data and the second data; and performing the task requested by a user, using at least one application program from among the plurality of application programs, according to the received sequence.

In this instance, the plurality of application programs may include the first program that is running in the foreground and a second application program. The second application program may include, for example, an application program that is running in the background, a paused application program, or an application program that is closed within a predetermined period.

The detailed structure and operation of the memory 1204 may correspond to the memory 140 of FIG. 2 which has been described above and a memory 1930 of FIG. 13 which will be described later, and thus, the overlapping descriptions will be omitted.

The communication circuit 1205 may communicate with the server 700 via a wireless network or a wired network. In this instance, the communication between the communication circuit 1205 and the server 700 may include communication via a third device. The third device may include, for example, a relay, such as an access point (AP), a gateway, a router, a hub, a base station or the like.

The communication circuit 1205 may transmit, to the server 700, the first data related to a user input generated from the UE 100 and the second data including information associated with the plurality of application programs. The detailed structure and operation of the communication circuit 1205 may correspond to a communication module 1990 of FIG. 13 which will be described later, and thus, the overlapping descriptions will be omitted.

The processor 1201 may call at least some of the instructions stored in the memory 1204 and may obtain the sequence of the states for the UE 100 according to an embodiment of the present disclosure.

According to various embodiments, the processor 1201 may display the execution screen of the first application program on the display 1202. If a user input that requests the execution of a task is received via the microphone 1203 while the execution screen of the first application program is displayed, the processor 1201 may transmit first data related to the user input and second data including information associated with the plurality of application programs to the server 700 via the communication circuit 1205. The processor 1201 may receive third data including the sequence of the UE 100 from the server 700 via the communication circuit 1205 in response to the transmission of the first data and the second data. The processor 1201 may perform the task requested by the user using at least one application program from among the plurality of applications, according to the received sequence.

The server 700 may include a processor 1211, a communication circuit 1212, and a memory 1213.

The communication circuit 1212 may communicate with the UE 100 via a wireless network or a wired network. In this instance, the communication between the communication circuit 1212 and the UE 100 may include communication via a third device. The third device may include, for example, a relay, such as an access point (AP), a gateway, a router, a hub, a base station or the like. The communication circuit 1212 may include a wireless communication module that supports cellular communication, short-range wireless communication, GNSS communication, or the like. Alternatively, the communication circuit 1212 may include a wired communication module such as LAN or low-power communication. The wireless communication module and the wired communication module may correspond to a wireless communication module and a wired communication module of the communication module 1990 of FIG. 13 which will be described later, and thus, the overlapping descriptions will be omitted.

According to various embodiments, the memory 1213 may store instructions configured to enable the processor 1211 to perform operations when the server 700 operates, the operations including: receiving first data related to a user input that requests the performance of a task from the UE 100 via the communication circuit 1212; receiving second data including information associated with a plurality of application programs from the UE 100 via the communication circuit 1212; determining a domain related to the task based on the first data and the second data; determining a user intention associated with the task, based on the first data; and determining a sequence of the UE 100 in order to perform the task, based on the domain and the user intention.

In this instance, the plurality of application programs may include an application program that is running in the foreground of the UE 100 when the user input is provided. Also, the plurality of application programs may include an application program that is running in the background of the UE 100 when the user input is provided. Also, the plurality of application programs may include an application program that is paused in the UE 100 before the user input is provided. Also, the plurality of application programs may include an application program that is closed in the UE 100 within a predetermined period before the user input is provided.

According to various embodiments, the memory 1213 may further include instructions configured to enable the processor 1211 to provide third data including the sequence of states to the UE 100 via the communication circuit 1212.

According to various embodiments, the memory 1213 may store instructions configured to enable the processor 1211 to perform: receiving third data including information associated with at least one application program from another UE (not illustrated) via the communication circuit 1212; determining a domain related to a task based on the first data, second data, and third data; and determining the sequence of states for the UE 100 or the other UE (not illustrated) in order to perform the task, based on the determined domain and a user intention.

According to various embodiments, the memory 1213 may include instructions configured to enable the processor 1211 to determine the domain related to the task, based at least one piece of information from among user information associated with a user who uses the UE 100 and user experience information including a history of execution performed by a user input in the first external device.

According to various embodiments, the memory 1213 may store instructions configured to enable the processor 1211 to determine the domain related to the task from among domains respectively corresponding to the plurality of applications, when determining the domain related to the task.

According to various embodiments, the memory 1213 may store instructions configured to enable the processor 1211 to determine a parameter related to the task based on the first data and the second data, and to determine the sequence of the states of the UE 100 in order to perform task, based on the determined domain, user intention, and parameter.

The processor 1211 may call at least some of the instructions stored in the memory 1213 and may determine the sequence of the states for the UE 100 according to an embodiment of the present disclosure.

According to various embodiments, the processor 1211 may receive first data related to a user input that requests the performance of a task from the UE 100 via the communication circuit 1212. Also, the processor 1211 may receive second data including the information associated with a plurality of application programs from the UE 100 via the communication circuit 1212. Subsequently, the processor 1211 may determine a domain related to the task, based on the first data and the second data. Also, the processor 1211 may determine a user intention associated with the task based on the first data. The processor 1211 may determine the sequence of the states of the UE 100 in order to perform the task, based on the determined domain and user intention.

According to various embodiments, a system (e.g., the integrated intelligent system 10) may include a communication interface (e.g., the communication circuit 1212 of the server 700), at least one processor (e.g., the processor 1211 of the server 700) that is operably connected with the communication interface, and at least one memory (e.g., the memory 1213 of the server 700) that is operably connected with the at least one processor.

The at least one memory (e.g., the memory 1213 of the server 700) may store instructions configured to enable the processor (e.g., the processor 1211 of the server 700) to perform operations when the system (e.g., the integrated intelligent system 100) runs, the operations including: receiving first data including a user request that requests the performance of a task from a first external device (e.g., the UE 100) via a communication interface; receiving second data including information associated with a plurality of application programs related to the first external device (e.g., the UE 100) or a second external device (e.g., a third device) via the communication interface; determining a domain related to the task based at least partially on the first data and the second data; determining a user's likely intention based at least partially on the first data; and determining the sequence of states such that the first external device (e.g., the UE 100) or a second external device (e.g., a third device) performs the task.

In this instance, the plurality of application programs may include a first application program that is running in the foreground of the first external electronic device (e.g., the UE 100) when the user request is provided. Alternatively, the plurality of application programs may include a second application program that is running in the background of the first external electronic device (e.g., the UE 100) when the user request is provided. Alternatively, the plurality of application programs may include a third application program that is paused in the first external electronic device (e.g., the UE 100) before the user request is provided. Alternatively, the plurality of application programs may include a fourth application program that is closed in the first external electronic device (e.g., the UE 100) before the user request is provided. According to various embodiments, at least one memory (e.g., the memory 1213 of the server 700) may further include instructions configured to enable the processor (e.g., the processor 1211 of the server 700) to provide the sequence of states to the first external device (e.g., the UE 100) or the second external device (e.g., a third device) via the communication interface (e.g., the communication circuit 1212 of the server 700).

Figure 13:
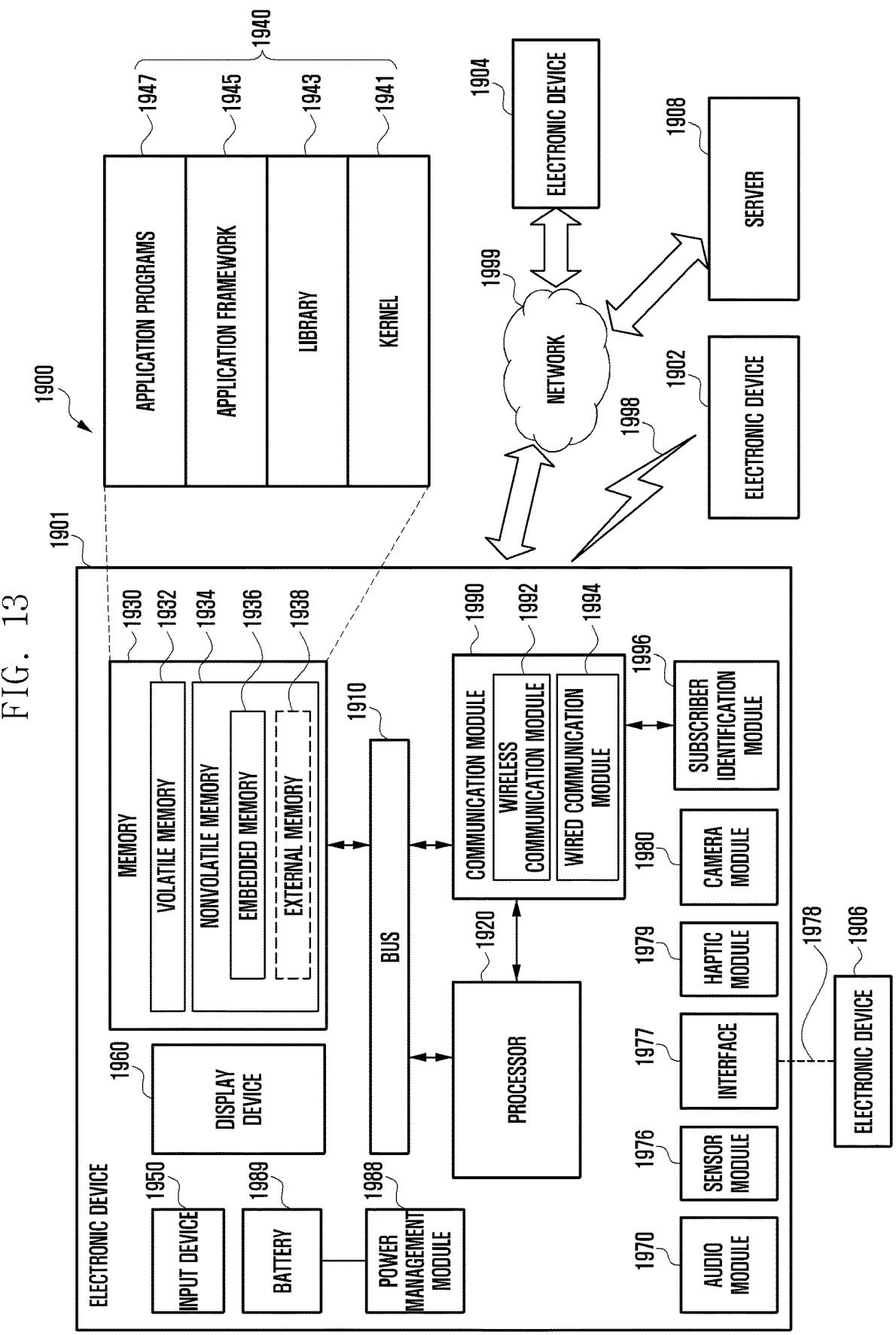
FIG. 13 is a block diagram illustrating an electronic device in a network environment according to various embodiments.

FIG. 13 is a block diagram illustrating an electronic device 1901 in a network environment 1900 according to various embodiments. The electronic device 1901 of FIG. 13 may include the UE 100 of FIGS. 2 to 12.

The electronic device 1901 according to various embodiments of the present disclosure may be provided in one of the various types of devices. The electronic device 1901 may include, for example, at least one from among a portable communication device (e.g., a smart phone), a computer device (e.g., a personal digital assistant (PDA), a tablet PC, a laptop PC, a desktop PC, a workstation, or a server), a portable multimedia device (e.g., an electronic book reader or an MP3 player), a portable medical device (e.g., instruments for measuring heartbeat, blood sugar, blood pressure, or temperature), a camera, and a wearable device. The wearable device may include at least one of an accessory type (e.g., a watch, a ring, a bracelet, an anklet, a necklace, glasses, contact lenses, or a head-mounted device (HMD)), a fabric or clothing integrated type (e.g., an electronic clothing), a body-mounted type (e.g., a skin pad or tattoo), and a bio-implantable circuit. According to embodiments, the electronic device may include, for example, at least one of a TV, a digital video disk (DVD) player, an audio device, an audio accessory device (e.g., a speaker, a headphone, or a headset), a refrigerator, an air-conditioner, a vacuum cleaner, an oven, a microwave oven, a washing machine, an air purifier, a set-top box, a home automation control panel, a security control panel, a game console, an electronic dictionary, an electronic key, a camcorder, and an electronic picture frame.

According to another embodiment, the electronic device 1901 may include, for example, at least one of a navigation device, a global navigation satellite system (GNSS), an event data recorder (e.g., a black box for a vehicle, a ship, or an airplane), a vehicle infortainment device (e.g., vehicle head-up display), an industrial robot or home robot, a drone, an automated teller machine (ATM), a point of sales (POS) device, a measurement instrument (e.g., a water meter, a electric meter, or a gas meter), and IoT device (e.g., a light, a sprinkler, a fire alarm, a temperature controller, or a streetlight). The electronic device 1901 according to embodiments of the present disclosure is not limited to the above-described devices. Also, the electronic device 1901 may provide the functions of a plurality of devices in combination, for example, a smart phone including a function of measuring individual's biometric information (e.g., heartbeat or blood sugar). In the present disclosure, the term "user" may indicate a person who uses an electronic device or a device (e.g., an artificial intelligence electronic device) that uses an electronic device.

Referring to FIG. 13, in the network environment 1900, the electronic device 1901 (e.g., the UE 100) may communicate with an electronic device 1902 via short-range wireless communication 1998, or may communicate with an electronic device 1904 or a server 1908 via a network 1999. According to an embodiment, the electronic device 1901 may communicate with the electronic device 1904 via the server 1908.

According to an embodiment, the electronic device 1901 may include a bus 1910, a processor 1920 (e.g., the processor 150), the memory 1930, the input device 1950 (e.g., a microphone or a mouse), the display device 1960, an audio module 1970, a sensor module 1976, an interface 1977, a haptic module 1979, a camera module 1980, a power management module 1988, a battery 1989, the communication module 1990, and a subscriber identification module 1996. According to an embodiment, the electronic device 1901 may omit at least one element (e.g., the display device 1960 or the camera module 1980) among the above-described elements, or may additionally include other elements.

The bus 1910 may include a circuit that interconnects the elements 1920 to 1990 and deliver signals (e.g., control messages and/or data) between the elements.

The processor 1920 may include one or more of a central processing unit (CPU), an application processor (AP), a graphics processing unit (GPU), an image signal processor (ISP) of a camera, and a communication processor (CP). According to an embodiment, the processor 1920 may be implemented as a system on chip (SoC) or a system in package (SiP). The processor 1920 may control at least one other element (e.g., hardware or software element) of the electronic device 1901 connected to the processor 1920 and may perform various data processing and operations by driving an operating system or an application program. The processor 1920 may load, in a volatile memory 1932, commands or data received from at least one of the other elements (e.g., the communication module 1990), may process the loaded commands or data, and may store resultant data in the nonvolatile memory 1934.

The memory 1930 may include the volatile memory 1932 or the nonvolatile memory 1934. The volatile memory 1932 may be implemented as, for example, a random access memory (RAM) (e.g., DRAM, SRAM, or SDRAM). The nonvolatile memory 1934 may be implemented as, for example, a programmable read-only memory (PROM), an onetime PROM (OTPROM), an erasable PROM (EPROM), an electrically EPROM (EEPROM), a mask ROM, a flash ROM, a flash memory, a hard disk drive (HDD), or a solid state drive (SSD). Also, according to the type of connection with the electronic device 1901, the nonvolatile memory 1934 may be implemented as an embedded memory 1936 that is contained in the electronic device 1901, or may be implemented as an external memory 1938 provided in the stand-alone form which may be connected when it is needed. The external memory 1938 may include a flash drive, for example, a compact flash (CF), a secure digital (SD), a Micro-SD, a Mini-SD, an eXtreme digital (xD), a multimedia card (MMC), a memory stick, and the like. The external memory 1938 may be functionally or physically connected to the electronic device 1901 via wired connection (e.g., a cable or a universal serial bus (USB)) or wireless connection (Bluetooth).

The memory 1930 may store, for example, commands or data relevant to at least one other software element of the electronic device 1901, for example, the program 1940. The program 1940 may include, for example, a kernel 1941, a library 1943, an application framework 1945, or application programs (applications) 1947.

The input device 1950 may include a microphone, a mouse, or a keyboard. According to an embodiment, the keyboard may be connected with a physical keyboard, or may be displayed as a virtual keyboard on the display device 1960.

The display device 1960 may include a display, a hologram device, or a projector, and a control circuit for controlling a corresponding device. The display may include, for example, a liquid crystal display (LCD), a light emitting diode (LED) display, an organic light emitting diode (OLED) display, a micro electro mechanical system (MEMS) display, or an electronic paper display. The display may be implemented to be, for example, flexible, transparent, or wearable. The display may include a touch circuitry capable of sensing a touch input, a gesture input, a proximity input, or a hovering input from a user, or may include a pressure sensor (or a force sensor) capable of measuring the intensity of a pressure by a touch input. The touch circuitry or the pressure sensor may be implemented to be integrated with a display, or may be implemented as one or more sensors separate from the display. The hologram device may show a three-dimensional image in the air using light interference. The projector may display an image by projecting light onto a screen. The screen may be disposed, for example, in the interior of, or on the exterior of, the electronic device 1901.

The audio module 1970 may convert, for example, sound into an electrical signal, and vice versa. According to an embodiment, the audio module 1970 may obtain sound via the input device 1950 (e.g., a microphone), or may output sound via an output device (not illustrated) (e.g., a speaker or a receiver) included in the electronic device 1901 or an external electronic device connected with the electronic device 1901 (e.g., the electronic device 1902 (e.g., a wireless speaker or a wireless headphone) or the electronic device 1906 (e.g., a wired speaker or a wired headphone)).

The sensor module 1976 may measure or sense, for example, an operation state (e.g., power or temperature) inside the electronic device 1901 or an environment state (e.g., altitude, humidity, or brightness) outside the electronic device 1901, and may generate an electric signal or data value corresponding to the measured or sensed state information. The sensor module 1976 may include, for example, a gesture sensor, a gyro sensor, an atmospheric pressure sensor, a magnetic sensor, an acceleration sensor, a grip sensor, a proximity sensor, a color sensor (red, green, blue (RGB) sensor), an infrared (IR) sensor, a biometric sensor (e.g., an iris sensor, a fingerprint sensor, or a heartbeat rate monitoring (HRM) sensor, an electronic nose sensor, an electromyography (EMG) sensor, an electroencephalogram (EEG) sensor, or an electrocardiogram (ECG) sensor), a temperature sensor, a humidity sensor, an illumination sensor, or a ultraviolet sensor. The sensor module 1976 may further include a control circuit for controlling at least one sensor included therein. According to an embodiment, the electronic device 1901 may control the sensor module 1976 using the processor 1920 or a processor (e.g., a sensor hub) that is included independently of the processor 1920. When the separate processor (e.g., a sensor hub) is used, the electronic device 1901 controls at least some operations or states of the sensor module 1979 by operating the separate processor without waking up the processor 1920 when the processor 1920 is in the sleep state.

According to an embodiment, the interface 1977 may include a high definition multimedia interface (HDMI), a USB, an optical interface, a recommended standard 232 (RS-232), a D-subminiature (D-sub), a mobile high-definition link (MHL) interface, an SD card/multi-media card (MMC) interface, or an audio interface. A connection terminal 1978 may physically connect the electronic device 1901 and the electronic device 1906. According to an embodiment, the connection terminal 1978 may include, for example, a USB connector, an SD card/MMC connector, or an audio connector (e.g., a headphone connector).

The haptic module 1979 may convert an electric signal into a mechanical stimulus (e.g., a vibration or movement) or an electrical stimulus. For example, the haptic module 1979 may provide a stimulus associated with the touch sensation or the motor sensation to a user. The haptic module 1979 may include, for example, a motor, a piezoelectric effect element, or an electrostimulator.

The camera module 1980 may shoot, for example, a still image and a video. According to an embodiment, the camera module 1980 may include one or more lenses (e.g., a wide-angle lens and telephoto lens, or a front lens and rear lens), an image sensor, an image signal processor, or a flash (e.g., light emitting diode or xenon lamp). The power management module 1988 may be a module for managing power of the electronic device 1901, and may be implemented as, for example, at least a part of a power management integrated circuit (PMIC).

The battery 1989 may include, for example, a primary battery, a secondary battery, or a fuel battery. The battery 1989 may be recharged by an external power source, and may provide power to at least one element of the electronic device 1901.

The communication module 1990, for example, may establish a communication channel between the electronic device 1901 and an external device (e.g., the first external electronic device 1902, the second external electronic device 1904, or the server 1908), and may support wired or wireless communication via the established communication channel. According to an embodiment, the communication module 1990 may include the wireless communication module 1992 or the wired communication module 1994, and may communicate with an external device via a first network 1998 (e.g., a short-range communication network such as Bluetooth or infrared data association (IrDA)) or a second network 1999 (e.g., a long-range communication network such as a cellular network) using a corresponding communication module.

The wireless communication module 1992 may support, for example, cellular communication, short-range wireless communication, or GNSS communication. The cellular communication may include, for example, long term evolution (LTE), LTE-Advanced (LTE-A), code division multiple access (CDMA), wideband CDMA (WCDMA), universal mobile telecommunications system (UMTS), wireless broadband (WiBro), or global system for mobile communications (GSM). The short-range wireless communication may include, for example, wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or body area network (BAN). GNSS may include, for example, a global positioning system (GPS), a global navigation satellite system (Glonass), a Beidou navigation satellite system (hereinafter, referred to as "Beidou"), or Galileo (the European global satellite-based navigation system). In this document, the term "GPS" may be interchangeable with the term "GNSS".

According to an embodiment, when cellular communication is supported, the wireless communication module 1992 may distinguish and authenticate the electronic device 1901 in a communication network using, for example, the subscriber identification module 1996. According to an embodiment, the wireless communication module 1992 may include a CP which is independent of the processor 1920 (e.g., AP). In this instance, the CP may perform at least some of the functions related to at least one of the elements 1910 to 1996 of the electronic device 1901, as a substitute of the processor 1920 while the processor 1920 is in the inactive state (sleep state), or together with the processor 1920 while the processor 1920 is in the active state. According to an embodiment, the wireless communication module 1992 may include a plurality of communication modules supporting only a corresponding communication scheme from among a cellular communication module, a short-range wireless communication module, or GNSS communication module.

The wired communication module 1994 may include, for example, a local area network (LAN), power line communication, or a plain old telephone service (POTS).

The first network 1998 may include, for example, Wi-Fi direct or Bluetooth that is capable of transmitting or receiving commands or data via a direct wireless connection between the electronic device 1901 and the first external electronic device 1902. The second network 1999 may include, for example, a telecommunication network (e.g., a computer network such as (a local area network (LAN) or a wide area network (WAN), the Internet, or a telephone network) capable of transmitting or receiving commands or data between the electronic device 1901 and the second external electronic device 1904.

According to various embodiments, the commands or the data may be transmitted or received between the electronic device 1901 and the second external electronic device 1904 via the server 1908 connected to the second network. Each of the first and second external electronic devices 1902 and 1904 may be of a type which is the same as, or different from, that of the electronic device 1901. According to various embodiments, all or some of the operations performed in the electronic device 1901 may be performed in another electronic device or a plurality of electronic devices (e.g., the electronic device 1902 or 1904, or the server 1908). According to an embodiment, when the electronic device 1901 has to perform a function or service automatically or in response to a request, the electronic device 1901 may request another device (e.g., the electronic device 1902 or 1904, or the server 1908) to perform at least some functions relating thereto, instead of, or in addition to, autonomously performing the function or service. Another electronic device (e.g., the electronic device 1902 or 1904, or the server 1908) may execute the requested functions or the additional functions, and may deliver a result thereof to the electronic device 1901. The electronic device 1901 may provide the received result as it is, or may additionally process the received result to provide the requested functions or services. To this end, for example, cloud computing, distributed computing, or client-server computing technology may be used.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The terms "A or B", "one or more of A and/or B", "A, B, or C", or "one or more of A, B and/or C" may include all possible combinations of them. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit consisting of hardware, or hardware programmed with software, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Various embodiments of the present disclosure may be implemented by software including instructions which are stored in machine (e.g., computer)-readable storage medium (e.g., the memory 1213 of the server 700 or the memory 1204 of UE 100). The machine is a device that is capable of retrieving a stored instruction from a storage medium, and operates according to the retrieved instruction, and may include the server 700 or the UE 100 according to embodiments of the present disclosure. When the instruction is executed by a processor (e.g., the processor 1201 of the server 700 or the processor 1211 of the UE 100), the processor may directly perform a function corresponding to the instruction, or may perform the function corresponding to the instruction using other elements under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

The method according to various embodiments disclosed herein may be included and provided in a computer program product. The computer program product may be traded as a product between a seller and a buyer. For example, a computer program product may be a downloadable application or computer program which is traded between a seller and a purchaser. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

What is claimed is:

1. A server, comprising:
a communication circuit;
at least one processor electrically connected to the communication circuit;
at least one memory electrically connected to the at least one processor, wherein the at least one memory stores instructions, which are configured to enable the at least one processor to perform operations when the server operates, the operations comprising:
receiving, from a first external device via the communication circuit, first data related to a user input that requests performance of a task;
receiving, from the first external device via the communication circuit, second data associated with a plurality of application programs, wherein the second data comprising a plurality of predetermined path rule sets, each respective set comprising a sequence of states defining a plurality of actions to be executed to perform the task, the actions are sequentially arranged according to a parameter input for each of the plurality of actions in each respective set,
converting the first data to text using an automatic speech recognition module;
determining a domain related to the task based on at least a portion of the text and at least a portion of the second data;
determining a likely intention of a user providing the user input, based on the at least a portion of the text;
determining a sequence of states of the first external device based on the domain, the likely intention, and a path rule set randomly selected from the plurality of path rule sets, wherein the sequence of states comprises information indicating a plurality of functions to be executed at the first external device, the plurality of functions comprising a first function of a first application and a second function of a second application, and wherein the first application and the second application are different from the automatic speech recognition module, and each path rule set of the plurality of path rule sets are a respective ordering of the first function of the first application and the second function of the second application;
providing the sequence of states comprising the information to the first external device; and
executing the sequence of states at the first external device.

2. The server of claim 1, wherein the plurality of application programs includes an application program that is running in a foreground of the first external device when the user input is provided.

3. The server of claim 1, wherein the plurality of application programs includes an application program that is running in a background of the first external device when the user input is provided.

4. The server of claim 1, wherein the plurality of application programs includes an application program that is paused in the first external device before the user input is provided.

5. The server of claim 1, wherein the plurality of application programs includes an application program that is closed within a predetermined period in the first external device before the user input is provided.

6. The server of claim 1, wherein the at least one memory further comprises instructions configured to enable the at least one processor to provide third data including the sequence of states to the first external device via the communication circuit.

7. The server of claim 1, wherein the at least one memory stores instructions configured to enable the processor to perform:
receiving third data including information associated with at least one application program from a second external device via the communication circuit; and
determining the domain related to the task based on the at least a portion of the first data, the at least a portion of the second data, and the third data.

8. The server of claim 1, wherein the at least one memory comprises instructions configured to enable the at least one processor to determine the domain related to the task, based on at least one from among user information indicating the user who uses the first external device and a history of execution performed based on the user's input to the first external device.

9. The server of claim 1, wherein the second data associated with the plurality of application programs includes at least one from among an identifier of at least one of the plurality of application programs, recent operation information, a path rule including recent operation, execution screen information associated with execution of the recent operation, and hierarchy structure information corresponding to the recent operation.

10. The server of claim 1, wherein the at least one memory stores instructions configured to enable the at least one processor to determine the domain related to the task from among domains respectively corresponding to the plurality of application programs when the at least one processor determines the domain related to the task.

11. The server of claim 1, wherein the at least one memory stores instructions configured to perform:
determining a parameter related to the task based on the at least a portion of the first data and the second data; and
wherein determining the sequence of the states of the first external device is further based the parameter.

12. A method of determining an operation state of an external device, by a server, the method comprising:
receiving, from a first external device, first data related to a user input that requests a task;
receiving second data including information associated with a plurality of application programs from the first external device, the second data comprising a plurality of predetermined path rule sets, each respective set comprising a sequence of states defining a plurality of actions to be executed to perform the task, the actions sequentially arranged according to a parameter input for each of the plurality of actions in each respective set;
converting the first data to text using an automatic speech recognition module;
determining a domain related to the task based on at least a portion of the text and at least some of the second data;
determining a user's likely intention associated with the task, based on the at least a portion of the text;
determining a sequence of states for the first external device based on the domain, the likely intention, and a path rule set randomly selected from the plurality of path rule sets, wherein the sequence of states comprises information indicating a plurality of functions to be executed at the first external device comprising a first function of a first application and a second function of a second application, and wherein the first application and the second application are different from the automatic speech recognition module, and each path rule set of the plurality of path rule sets are a respective ordering of the first function of the first application and the second function of the second application;

providing the sequence of states comprising the information to the first external device and executing the sequence of states at the first external device.

13. The method of claim 12, wherein the plurality of application programs includes a first application program that is running in a foreground of the first external device and a second application program that is an application program that is running in a background, paused, or closed within a predetermined period.

14. The method of claim 12, wherein the method further comprises: receiving third data including information associated with at least one application program from a second external device, the determining the domain related to the task comprises: determining the domain related to the task based on the at least a portion of the first data, the at least a portion of the second data, and the third data.

15. The method of claim 12, wherein the determining the domain related to the task comprises: determining the domain related to the task based on at least one from among user information indicating the user who uses the first external device, and user experience information including a history of execution performed based on the user input in the first external device.

16. A computer program product including a non-transitory computer-readable recording medium, the computer program product comprising instructions, wherein the instructions are configured to enable an electronic device to perform:

receiving first data related to a user input that requests a task from a first external electronic device;

receiving second data including information associated with a plurality of application programs from the first external electronic device, the second data comprising a plurality of predetermined path rule sets, each respective set comprising a sequence of states defining a plurality of actions to be executed to perform the task, the actions sequentially arranged according to a parameter input for each of the plurality of actions in each respective set;

converting the first data to text using an automatic speech recognition module;

determining a domain related to the task based on at least a portion of the text and at least a portion of the second data;

determining a user's likely intention associated with the task based on the at least a portion of the first data;

determining a sequence of states for a first external device based on the domain, the likely intention, and an optimal path rule set selected from the plurality of path rule sets, wherein the sequence of states comprises information indicating a plurality of functions to be executed at the first external device comprising a first function of a first application and a second function of a second application, and wherein the first application and the second application are different from the automatic speech recognition module, and each path rule set of the plurality of path rule sets are a respective ordering of the first function of the first application and the second function of the second application;

providing the sequence of states comprising the information to the first external device; and executing the sequence of states at the first external device.

* * * * *